US012750258B2

(12) United States Patent
Ryu et al.

(10) Patent No.: US 12,750,258 B2
(45) Date of Patent: Sep. 29, 2026

(54) EQUALIZER AND TRANSMITTER INCLUDING THE SAME

(71) Applicant: Samsung Electronics Co., Ltd., Suwon-si (KR)

(72) Inventors: Jinmyeong Ryu, Suwon-si (KR); Jaeduk Han, Seoul-si (KR); Soonjae Won, Suwon-si (KR); Youngho Kwak, Suwon-si (KR); Dongho Choi, Suwon-si (KR); Hyeongmin Seo, Seoul-si (KR); Wookjin Shin, Seoul-si (KR)

(73) Assignees: Samsung Electronics Co., Ltd., Suwon-si (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 38 days.

(21) Appl. No.: 18/952,047

(22) Filed: Nov. 19, 2024

(65) Prior Publication Data

US 2025/0240191 A1 Jul. 24, 2025

(30) Foreign Application Priority Data

Jan. 18, 2024 (KR) ........................ 10-2024-0008287

(51) Int. Cl.
*H04L 25/03* (2006.01)
*H04L 25/02* (2006.01)

(52) U.S. Cl.
CPC .... *H04L 25/03038* (2013.01); *H04L 25/0264* (2013.01); *H04L 25/03878* (2013.01)

(58) Field of Classification Search
CPC ... H04B 1/04; H04B 1/38; H04B 1/40; H04B 2001/0425; H04L 25/026; H04L 25/0264;
(Continued)

(56) References Cited

U.S. PATENT DOCUMENTS 8,929,428 B2 1/2015 Francese et al.
9,385,898 B2 7/2016 Kizer et al.
(Continued)

FOREIGN PATENT DOCUMENTS

KR 10-2421896 B1 7/2022
KR 10-2568428 B1 8/2023

*Primary Examiner* — Young T. Tse
(74) *Attorney, Agent, or Firm* — Fish & Richardson P.C.

(57) ABSTRACT

An equalizer includes a delay circuit configured to generate at least one delay signal based on at least one input signal, an encoding circuit configured to generate a plurality of driving signals and a connection switching signal, based on the input signal and the delay signal, a pre-driver configured to generate a plurality of driving switching signals based on the plurality of driving signals, a first differential circuit configured to generate a first differential output signal based on the plurality of driving switching signals, a second differential circuit configured to generate a second differential output signal based on the plurality of driving switching signals, and a connection circuit configured to adjust a connection between the first differential circuit and the second differential circuit based on the connection switching signal.

20 Claims, 17 Drawing Sheets

(58) Field of Classification Search
CPC ............. H04L 25/0272; H04L 25/0286; H04L 25/03006; H04L 25/03019; H04L 25/03025; H04L 25/03038; H04L 25/03108; H04L 25/03146; H04L 25/03254; H04L 25/03878; H04L 25/03885; H04L 25/03891
USPC ....... 375/219, 229, 232, 295–297; 333/28 R; 370/282, 284; 455/114.2, 114.3; 708/322, 323
See application file for complete search history.

(56) References Cited

U.S. PATENT DOCUMENTS

| | | | | |
|---|---|---|---|---|
| 9,432,225 | B2 | 8/2016 | Bauwelinck et al. | |
| 9,503,293 | B2 | 11/2016 | Kim | |
| 10,728,060 | B2 | 7/2020 | Peng et al. | |
| 10,924,307 | B1 * | 2/2021 | Zhang | H03K 17/60 |
| 11,283,655 | B2 | 3/2022 | Jeong et al. | |
| 2016/0226734 | A1 * | 8/2016 | Pandey | H04B 3/462 |
| 2023/0281151 | A1 * | 9/2023 | Fujita | H04B 10/075 |

* cited by examiner

EQUALIZER AND TRANSMITTER INCLUDING THE SAME

CROSS-REFERENCE TO RELATED APPLICATION

This U.S. non-provisional application is based on and claims the benefit of priority under 35 U.S.C. § 119 to Korean Patent Application No. 10-2024-0008287, filed on Jan. 18, 2024, in the Korean Intellectual Property Office, the disclosure of which is incorporated by reference herein in its entirety.

BACKGROUND

Various example embodiments of the inventive concepts relate to an equalizer including a connection circuit, a system including the equalizer, and/or a method of operating the equalizer, etc.

Electronic devices may transfer an electrical signal to another electronic device through a channel to exchange information. When signals are transmitted and/or received between electronic devices, signal distortion may occur due to response characteristics of the channel. Various types of equalizers are used to compensate for the signal distortion.

Equalizers may transfer a signal through a plurality of switching elements. In this case, as statuses of a plurality of switching elements are changed based on a pattern of the signal input to the equalizer, the output resistance of the equalizer may be changed. When the output resistance of the equalizer is changed, impedance matching may fail and/or decrease, causing problems such as reflection and/or distortion of the signal being transmitted between a transmitter and the channel. Therefore, it is desired and/or required to develop an equalizer which performs more accurate impedance matching and/or has improved impedance matching, etc.

SUMMARY

Various example embodiments of the inventive concepts provide an equalizer which may perform impedance matching more accurately and/or may have improved impedance matching performance, a system including the equalizer, and/or a method of operating the equalizer, etc.

An equalizer according to at least one example embodiment includes a delay circuit configured to generate at least one delay signal based on at least one input signal, an encoding circuit configured to generate a plurality of driving signals and a connection switching signal, based on the input signal and the delay signal, a pre-driver configured to generate a plurality of driving switching signals based on the plurality of driving signals, a first differential circuit configured to generate a first differential output signal based on the plurality of driving switching signals, a second differential circuit configured to generate a second differential output signal based on the plurality of driving switching signals, and a connection circuit configured to adjust a connection between the first differential circuit and the second differential circuit based on the connection switching signal.

An equalizer according to at least one example embodiment includes a delay circuit configured to generate one or more delay signals based on at least one input signal, an encoding circuit configured to generate a plurality of driving signals and one or more connection switching signals based on the input signal and the one or more delay signals, a pre-driver configured to generate a plurality of driving switching signals based on the plurality of driving signals, a first differential circuit configured to generate a first differential output signal based on the plurality of driving switching signals, a second differential circuit configured to generate a second differential output signal based on the plurality of driving switching signals, and a connection circuit configured to adjust a connection between the first differential circuit and the second differential circuit based on the one or more connection switching signals.

A transmitter for transmitting an input signal through a channel, according to at least one example embodiment, includes a serializer configured to convert the input signal into a serial input signal, and an equalizer configured to generate a first differential output signal and a second differential output signal based on the serial input signal, the equalizer including, a delay circuit configured to generate one or more delay signals based on at least one input signal, an encoding circuit configured to generate a plurality of driving signals and one or more connection switching signals based on the at least one input signal and the one or more delay signals, a pre-driver configured to generate a plurality of driving switching signals based on the plurality of driving signals, a first differential circuit configured to generate a first differential output signal based on the plurality of driving switching signals, a second differential circuit configured to generate a second differential output signal based on the plurality of driving switching signals, and a connection circuit configured to adjust a connection between the first differential circuit and the second differential circuit based on the one or more connection switching signals.

BRIEF DESCRIPTION OF THE DRAWINGS

Various example embodiments will be more clearly understood from the following detailed description taken in conjunction with the accompanying drawings in which.

DETAILED DESCRIPTION

Hereinafter, various example embodiments will be described in detail with reference to the accompanying drawings.

Figure 1:
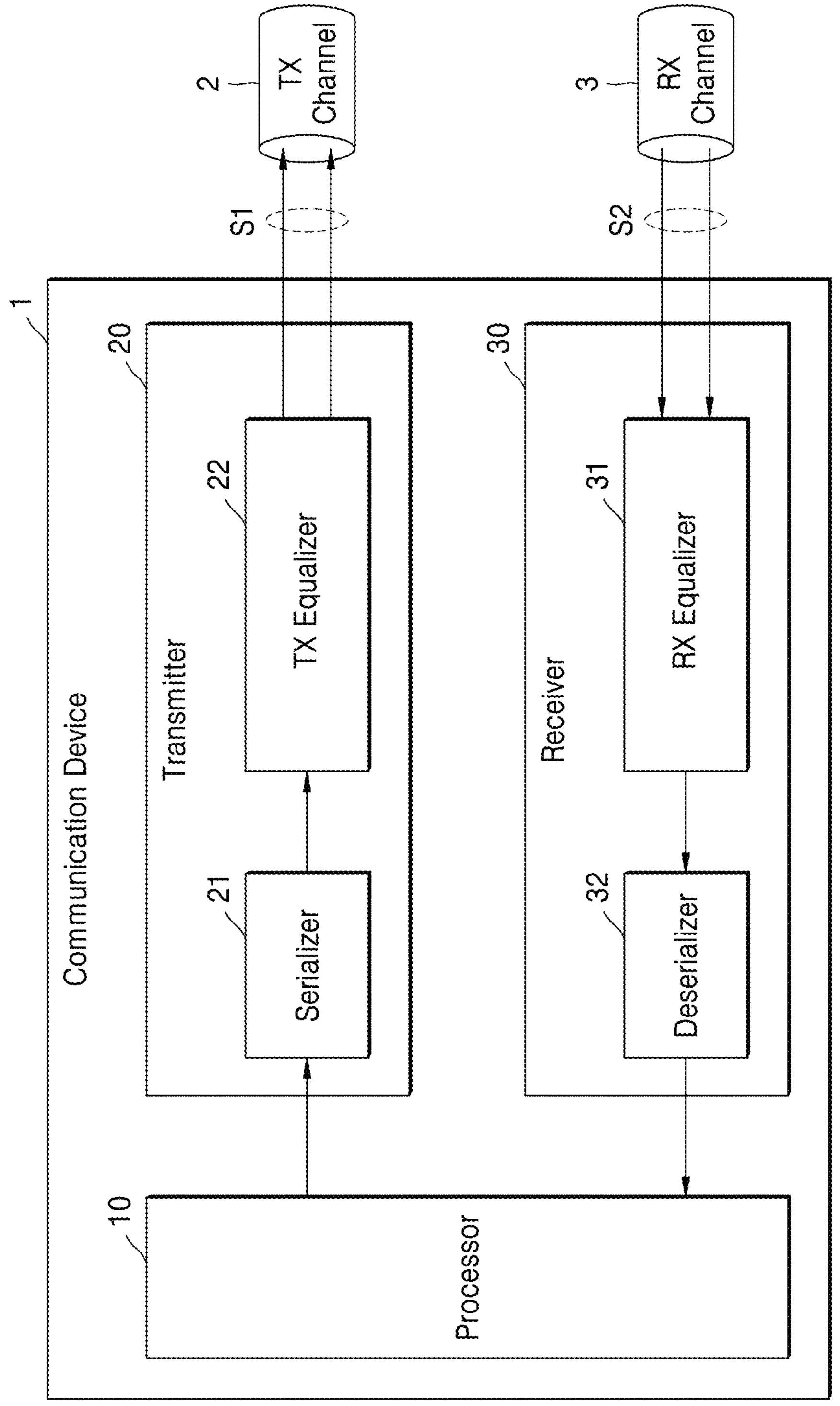
FIG. 1 is a block diagram illustrating a communication device according to at least one example embodiment.

FIG. 1 is a block diagram illustrating a communication device 1 according to at least one example embodiment.

Referring to FIG. 1, the communication device 1 (e.g., a first communication device, etc.) may perform serial communication with another communication device (e.g., a second communication device, etc.)(not shown) through a TX channel 2 and an RX channel 3, but the example embodiments are not limited thereto. In FIG. 1, it is illustrated that the communication device 1 communicates with another communication device through a full duplex communication scheme (e.g., through two channels such as the TX channel 2 and the RX channel 3, etc.), but the example embodiments of the inventive concepts are not limited thereto. In other example embodiments, the communication device 1 may communicate with another communication device through a half-duplex communication scheme (e.g., through one channel), and/or using three or more channels, etc.

The TX channel 2 and/or the RX channel 3 may denote a connection between the communication device 1 and another communication device, and serial signals S1 and S2 may respectively move through the TX channel 2 and/or the RX channel 3. For example, the TX channel 2 and/or the RX channel 3 may include at least one of a conductive line of an integrated circuit, a pattern of a printed circuit board (PCB), a connector, and/or a cable, etc. The serial signals S1 and S2 respectively passing through the TX channel 2 and the RX channel 3 may each be a differential signal, as illustrated in FIG. 1, but are not limited thereto.

The communication device 1 may be a device which serially communicates with another communication device through the TX channel 2 and the RX channel 3, but is not limited thereto. In at least one example embodiment, the communication device 1 may be a die included in a semiconductor package and may serially communicate with another communication device included in the same semiconductor package, but is not limited thereto. In at least one example embodiment, the communication device 1 may be a semiconductor package mounted on a PCB and may serially communicate with another communication device mounted on the same PCB and/or a different PCB, etc. In at least one example embodiment, the communication device 1 may be a system (for example, a storage, a computing system, etc.) including at least one semiconductor package and/or a PCB, etc., and may serially communicate with another system.

The communication device 1 may include a processor 10, a transmitter 20, and/or a receiver 30, etc., but is not limited thereto and may for example, include a greater or lesser number of constituent components. In at least one example embodiment, the transmitter 20 and the receiver 30 may be combined into a single transceiver and may be implemented as one block. The processor 10, the transmitter 20, and the receiver 30 may provide a physical layer for communication and may be referred to as a serializer/deserializer (SerDes) for serial communication. According to some example embodiments, one or more of the processor 10, the transmitter 20, and/or the receiver 30, etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The processor 10 may provide the transmitter 20 with at least one transmission signal, which is at least one signal to transmit through the TX channel 2, and/or may receive at least one reception signal, which is at least one signal received through the RX channel 3, from the receiver 30. The transmission signal and/or the reception signal may move through a plurality of signal lines, namely, a bus.

The processor 10 may generate the transmission signal and/or may process the reception signal based on at least one desired communication protocol (for example, a protocol prescribed by the Optical Internetworking Forum (OIF), the Institute of Electrical and Electronics Engineers (IEEE), etc.). For example, the processor 10 may process source data received from another element included in the communication device 1 and/or the outside of (e.g., external to) the communication device 1 to generate the transmission signal. Also, the processor 10 may provide result data, e.g., generated by processing the reception signal, to another element included in the communication device 1 and/or the outside of (e.g., external to) the communication device 1, etc. The processor 10 may include at least one of a hardware block designed through logic synthesis and/or a software block including a plurality of computer readable instructions, etc., but is not limited thereto. Hereinafter, the transmission signal provided to the transmitter 20 may be referred to as an input signal.

The transmitter 20 may receive the transmission signal from the processor 10 and may output a serial signal S1 to the TX channel 2. As illustrated in FIG. 1, the transmitter 20 may include a serializer 21 and/or a TX equalizer 22, etc., but is not limited thereto. In at least one example embodiment, the transmitter 20 may be included in an integrated circuit which is manufactured through a semiconductor process, but is not limited thereto.

The serializer 21 may convert the transmission signal, received through the bus, into a serial transmission signal and transmit the serial transmission signal to the TX equalizer 22. For example, the serial transmission signal may include a series of symbols each having a unit interval (UI) of '1/baud rate', and when n is an integer which is more than 1, the serializer 21 may latch an n-bit transmission signal at a frequency of 'baud rate/n', but is not limited thereto.

The TX equalizer 22 may receive the serial transmission signal from the serializer 21 and may generate the serial signal S1. The TX equalizer 22 may perform equalization for compensating for distortion (for example, inter-symbol interference (ISI), etc.) of the serial signal S1 occurring in the TX channel 2. The TX equalizer 22 may output the serial signal S1 to the TX channel 2.

In at least one example embodiment, as described below with reference to FIG. 2, the TX equalizer 22 may include a connection circuit, and the connection circuit may adjust a connection between a first differential circuit and/or a second differential circuit to maintain an output resistance of an equalizer. As described above, as the output resistance of the equalizer is maintained, impedance matching may be accurately performed and/or improved impedance matching may be observed, and thus, the reflection and/or distortion of a signal may be reduced and/or prevented.

The receiver 30 may receive the serial signal S2 through the RX channel 3 and may provide the reception signal to the processor 10. As illustrated in FIG. 1, the receiver 30 may include an RX equalizer 31 and/or a deserializer 32, etc., but is not limited thereto. In at least one example embodiment, the receiver 30 may be included in an integrated circuit which is manufactured through a semiconductor process, but is not limited thereto.

The RX equalizer 31 may generate the reception signal based on the serial signal S2, which is a differential signal, but is not limited thereto. Also, the RX equalizer 31 may have an input impedance for performing impedance matching. The RX equalizer 31 may perform equalization to compensate for the distortion of the serial signal S2 occurring in the RX channel 3, etc.

The deserializer 32 may convert the reception signal received from the RX equalizer 31. For example, the reception signal may include a series of symbols each having a UI of '1/baud rate', and when n is an integer which is more than 1, the deserializer 32 may output an n-bit reception signal at a frequency of 'baud rate/n', but the example embodiments are not limited thereto.

Figure 2:
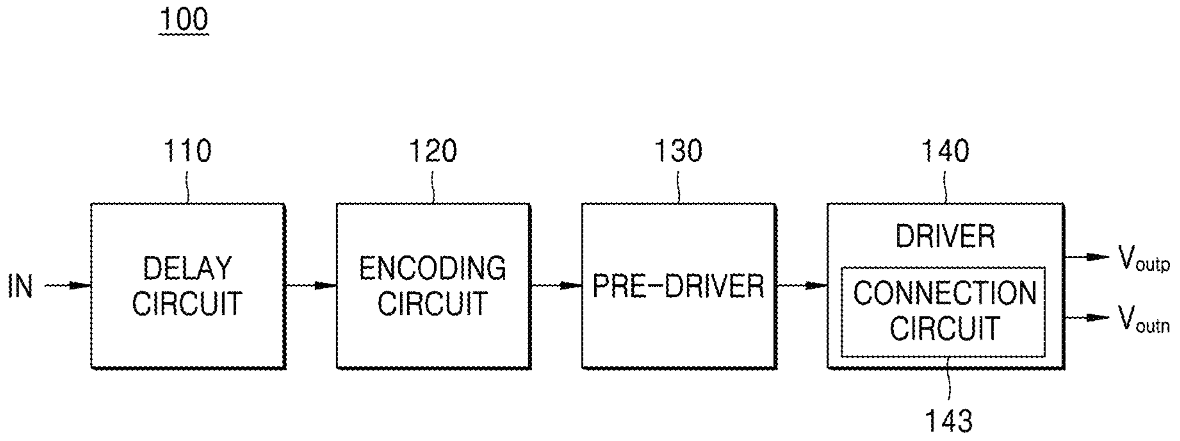
FIG. 2 is a block diagram illustrating an equalizer according to at least one example embodiment.

FIG. 2 is a block diagram illustrating an equalizer 100 according to at least one example embodiment.

Referring to FIG. 2, the equalizer 100 according to at least one example embodiment may include a delay circuit 110, an encoding circuit 120, a pre-driver 130, and/or a driver 140, etc., but the example embodiments are not limited thereto. According to some example embodiments, one or more of the equalizer 100, the delay circuit 110, the encoding circuit 120, the pre-driver 130, and/or the driver 140, etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The delay circuit 110 may generate one or more delay signals based on an input signal IN. The delay circuit 110 may include one or more latches, but is not limited thereto. The delay circuit 110 may delay the input signal IN by using the one or more latches to generate a delay signal. For example, when the input signal IN is x[0], the delay circuit 110 may delay x[0] by using the latch to generate a delay signal, such as x[1] or x[2], etc. The delay circuit 110 may output the generated delay signal to the encoding circuit 120.

A more detailed structure and operation of the delay circuit 110 will be described below with reference to FIGS. 3 and 9.

The encoding circuit 120 may generate a plurality of driving signals and/or a connection switching signal based on the input signal IN and one or more delay signals.

The encoding circuit 120 may generate the plurality of driving signals based on the input signal IN and the one or more delay signals. The encoding circuit 120 may output the generated plurality of driving signals to the pre-driver 130, etc.

Also, the encoding circuit 120 may generate one or more connection switching signals based on the plurality of driving signals. In this case, the encoding circuit 120 may generate the one or more connection switching signals based on the plurality of driving signals generated based on the same delay signal of the one or more delay signals, but is not limited thereto. The encoding circuit 120 may output the generated one or more connection switching signals to the driver 140, etc.

A more detailed structure and operation of the encoding circuit 120 will be described below with reference to FIGS. 4, 10A, and 10B.

The pre-driver 130 may generate a plurality of driving switching signals based on the plurality of driving signals. For example, the pre-driver 130 may perform at least one inversion operation on the plurality of driving signals to generate the plurality of driving switching signals, but is not limited thereto. According to some example embodiments, the pre-driver 130 may generate the plurality of driving switching signals by performing at least one inversion operation on some (e.g., a first set) of the plurality of driving signals using a ground voltage, and performing at least one inversion operation on a remaining (e.g., a second set) of the plurality of driving signals using an operation voltage, etc. The pre-driver 130 may output the generated plurality of driving switching signals to the driver 140, etc.

A more detailed structure and operation of the pre-driver 130 will be described below with reference to FIGS. 5 and 11.

The driver 140 may generate, for example, a first differential output signal $V_{outp}$ and a second differential output signal $V_{outn}$ based on the plurality of driving switching signals and the one or more connection switching signals, but the example embodiments are not limited thereto.

The driver 140 may include a first differential circuit and/or a second differential circuit, etc., but is not limited thereto.

The first differential circuit may generate the first differential output signal $V_{outp}$ based on the plurality of driving switching signals. The first differential circuit may include a plurality of positive output taps, etc. The plurality of positive output taps may generate the first differential output signal $V_{outp}$ as a plurality of switching elements included therein are turned on or off by the plurality of driving switching signals, but are not limited thereto.

The second differential circuit may generate the second differential output signal $V_{outp}$ based on the plurality of driving switching signals. The second differential circuit may include a plurality of negative output taps, but is not limited thereto. The plurality of negative output taps may generate the second differential output signal $V_{outn}$ as a plurality of switching elements included therein are turned on or off by the plurality of driving switching signals, but are not limited thereto.

The connection circuit (e.g., connection circuit 143) may adjust a connection between the first differential circuit and/or the second differential circuit based on the one or more connection switching signals, etc. The connection circuit may include one or more connection switching elements, but is not limited thereto. Each of the one or more connection switching elements may connect a positive output tap to a negative output tap when the positive output tap and the negative output tap each connected thereto are in an off state. As described above, the equalizer 100 according to at least one example embodiment may adjust a connection between the first differential circuit and the second differential circuit by using the connection circuit to maintain the output resistance of the equalizer 100. As described above, as the output resistance is maintained, impedance matching may be accurately performed and/or impedance matching may be improved, and thus, the reflection and/or distortion of a signal may be reduced and/or prevented, etc.

A more detailed structure and operation of the driver 140 will be described below with reference to FIGS. 6 and 12.

Figure 3:
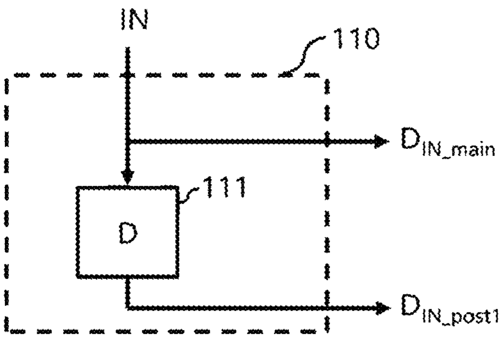
FIG. 3 is a circuit diagram illustrating an example of a delay circuit of an equalizer according to at least one example embodiment.

FIG. 3 is a circuit diagram illustrating an example of a delay circuit 110 of an equalizer 100 according to at least one example embodiment.

Referring to FIG. 3, the delay circuit 110 of the equalizer 100 according to at least one example embodiment may include at least one latch 111, etc., but is not limited thereto. In the at least one example embodiment of FIG. 3, the equalizer 100 including the delay circuit 110 may be a 2-tap equalizer where two output taps are included in a driver 140, but the example embodiments are not limited thereto, and for example, may be an equalizer with a greater or lesser number of taps, etc. When the equalizer 100 is the 2-tap equalizer, the delay circuit 110 may include one latch 111.

The delay circuit 110 of the equalizer 100 according to at least one example embodiment may include at least one latch 111, etc. The latch 111 may delay an input signal IN for a desired and/or predetermined delay time D to generate at least one delay signal. For example, when the input signal IN is x[0] and the delay time D of the latch 111 is 1, the latch 111 may output x[1] obtained through 1-time delay caused by the latch 111, etc.

In the at least one example embodiment of FIG. 3, the delay circuit 110 may output the input signal IN, which does not pass through the latch 111, as a reference input signal $D_{IN\_main}$ to the encoding circuit 120. The delay circuit 110 may output the input signal IN, passing through the latch 111, as a first post input signal $D_{IN\_post1}$ to the encoding circuit 120.

Figure 4:
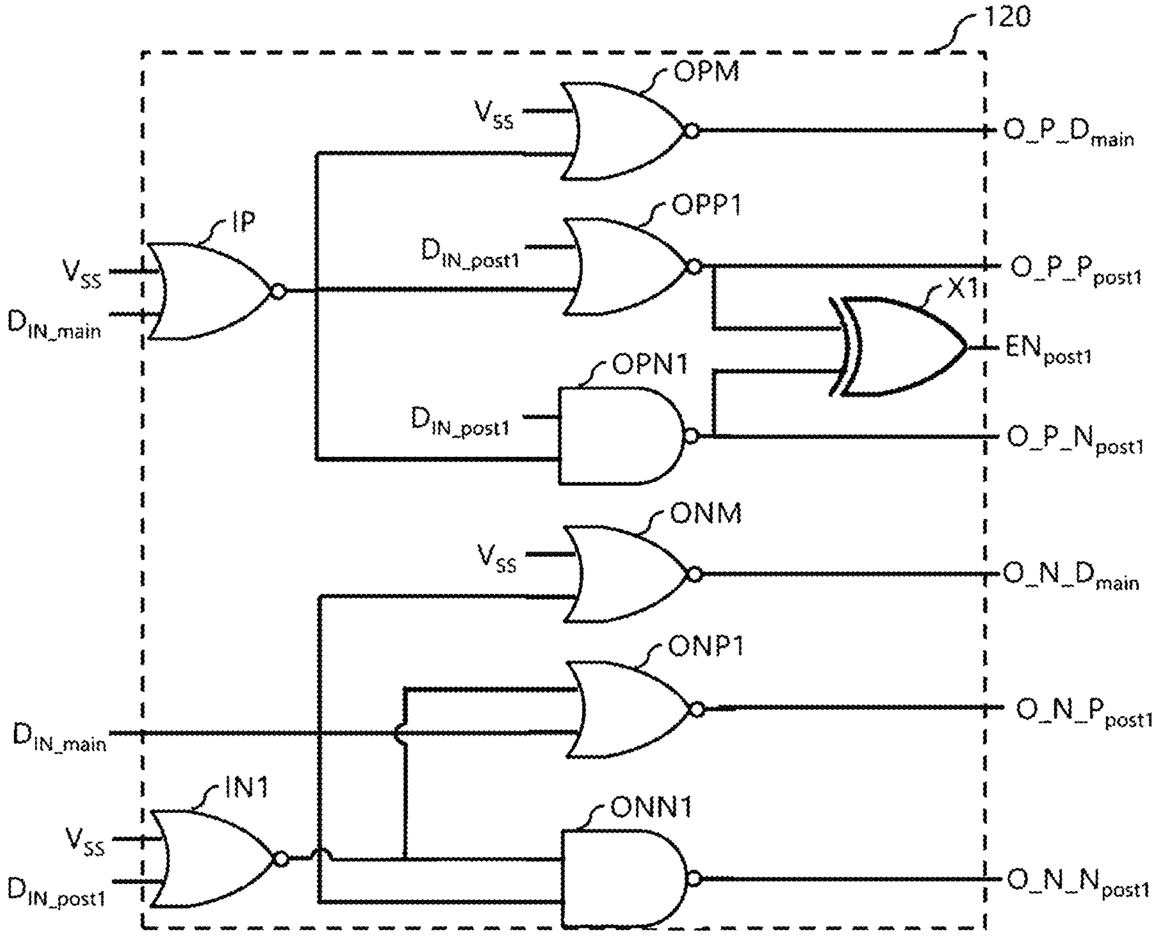
FIG. 4 is a circuit diagram illustrating an example of an encoding circuit of an equalizer according to at least one example embodiment.

FIG. 4 is a circuit diagram illustrating an example of an encoding circuit 120 of an equalizer 100 according to at least one example embodiment.

Referring to FIG. 4, the encoding circuit 120 of the equalizer 100 according to at least one example embodiment may include a plurality of NOR gates, a plurality of NAND gates, and/or an XOR gate, etc., but is not limited thereto. In the at least one example embodiment of FIG. 4, like the at least one example embodiment of FIG. 3, the equalizer 100 including the encoding circuit 120 may be a 2-tap equalizer where two output taps are included in a driver 140, but the example embodiments are not limited thereto, and for example, may be an equalizer with a greater or lesser number of taps, etc. When the equalizer 100 is the 2-tap equalizer, the encoding circuit 120 may be configured as illustrated in FIG. 4, but is not limited thereto.

The encoding circuit 120 may perform at least one logic operation on an input signal and/or a delay signal through the plurality of NOR gates and the plurality of NAND gates to generate a plurality of driving signals.

A NOR gate IP may receive a ground voltage $V_{SS}$ and a reference input signal $D_{IN\_main}$ as inputs, and may perform a NOR operation on the received inputs to output a result of the NOR operation.

A NOR gate OPM may receive the ground voltage $V_{SS}$ and an output signal of the NOR gate IP as inputs, and may perform a NOR operation on the received inputs to output a result of the NOR operation. An output of the NOR gate OPM may be a driving signal $O\_P\_D_{main}$.

A NOR gate OPP1 may receive a first post input signal $D_{IN\_post1}$ and the output signal of the NOR gate IP as inputs, and may perform a NOR operation on the received inputs to output a result of the NOR operation. An output of the NOR gate OPP1 may be a driving signal $O\_P\_P_{post1}$.

A NAND gate OPN1 may receive the first post input signal $D_{IN\_post1}$ and the output signal of the NOR gate IP as inputs, and may perform a NAND operation on the received inputs to output a result of the NAND operation. An output of the NAND gate OPN1 may be a driving signal $O\_P\_N_{post1}$.

A NOR gate IN1 may receive the ground voltage $V_{SS}$ and the first post input signal $D_{IN\_post1}$ as inputs, and may perform a NOR operation on the received inputs to output a result of the NOR operation.

A NOR gate ONM may receive the ground voltage $V_{SS}$ and the reference input signal $D_{IN\_main}$ as inputs, and may perform a NOR operation on the received inputs to output a result of the NOR operation. An output of the NOR gate ONM may be a driving signal $O\_N\_D_{main}$.

A NOR gate ONP1 may receive the reference input signal $D_{IN\_main}$ and the output signal of the NOR gate IN1 as inputs, and may perform a NOR operation on the received inputs to output a result of the NOR operation. An output of the NOR gate ONP1 may be a driving signal $O\_N\_P_{post1}$.

A NAND gate ONN1 may receive the reference input signal $D_{IN\_main}$ and the output signal of the NOR gate IN1 as inputs, and may perform a NAND operation on the received inputs to output a result of the NAND operation. An output of the NAND gate ONN1 may be a driving signal $O\_N\_N_{post1}$.

The encoding circuit 120 may generate at least one connection switching signal based on the plurality of driving signals generated based on the delay signal. For example, the encoding circuit 120 may perform an XOR operation on the plurality of driving signals generated based on the delay signal through the XOR gate to generate the connection switching signal, but is not limited thereto.

The XOR gate X1 may receive, as inputs, the driving signal $O\_P\_P_{post1}$ and the driving signal $O\_P\_N_{post1}$ each generated based on the first post input signal $D_{IN\_post1}$ which is a delay signal, and may perform an XOR operation on the received inputs to output a result of the XOR operation. An output of the XOR gate X1 may be a connection switching signal $EN_{post1}$.

Figure 5:
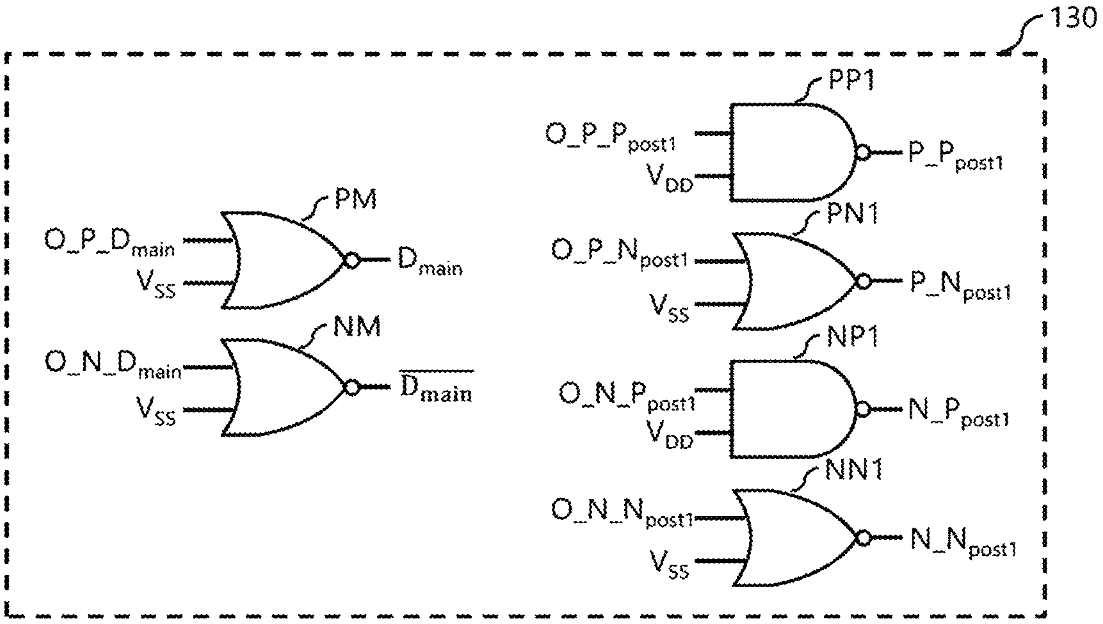
FIG. 5 is a circuit diagram illustrating an example of a pre-driver of an equalizer according to at least one example embodiment.

FIG. 5 is a circuit diagram illustrating an example of a pre-driver 130 of an equalizer 100 according to at least one example embodiment.

Referring to FIG. 5, the pre-driver 130 of the equalizer 100 according to at least one example embodiment may include a plurality of NOR gates and a plurality of NAND gates, but is not limited thereto. In the at least one example embodiment of FIG. 5, like the at least one example embodiments of FIGS. 3 and 4, the equalizer 100 including the pre-driver 130 may be a 2-tap equalizer where two output taps are included in a driver 140, but the example embodiments are not limited thereto, and for example, the equalizer may include a greater or lesser number of taps, etc. When the equalizer 100 is the 2-tap equalizer, the pre-driver 130 may be configured as illustrated in FIG. 5, but is not limited thereto.

The pre-driver 130 may perform an inversion operation on the plurality of driving signals through the plurality of NOR gates and the plurality of NAND gates to generate the plurality of driving switching signals.

The plurality of NOR gates included in the pre-driver 130 may receive a ground voltage $V_{SS}$ as one of the inputs. Therefore, the plurality of NOR gates included in the pre-driver 130 may invert the plurality of driving signals received as the other input to generate a plurality of driving switching signals and may output the generated plurality of driving switching signals.

Also, the plurality of NAND gates included in the pre-driver 130 may receive an operation voltage $V_{DD}$ as one of the inputs. Therefore, the plurality of NAND gates included in the pre-driver 130 may invert the plurality of driving signals received as the other input to generate a plurality of driving switching signals and may output the generated plurality of driving switching signals.

In more detail, a NOR gate PM may receive the ground voltage $V_{SS}$ and a driving signal $O\_P\_D_{main}$ as inputs, and may perform a NOR operation on the received inputs to output a result of the NOR operation. An output of the NOR gate PM may be a driving switching signal $D_{main}$ where a value of the driving signal $O\_P\_D_{main}$ is inverted.

A NAND gate PP1 may receive the operation voltage $V_{DD}$ and a driving signal $O\_P\_P_{post1}$ as inputs, and may perform a NAND operation on the received inputs to output a result of the NAND operation. An output of the NAND gate PP1 may be a driving switching signal $P\_P_{post1}$.

A NOR gate PN1 may receive the ground voltage $V_{SS}$ and a driving signal $O\_P\_N_{post1}$ as inputs, and may perform a NOR operation on the received inputs to output a result of the NOR operation. An output of the NOR gate PN1 may be a driving switching signal $P\_N_{post1}$.

A NOR gate NM may receive the ground voltage $V_{SS}$ and the driving signal $O\_N\_D_{main}$ as inputs, and may perform a NOR operation on the received inputs to output a result of the NOR operation. An output of the NOR gate NM may be a driving switching signal $\overline{D_{main}}$ where a value of the driving signal $O\_N\_D_{main}$ is inverted.

A NAND gate NP1 may receive the operation voltage $V_{DD}$ and a driving signal $O\_N\_P_{post1}$ as inputs, and may perform a NAND operation on the received inputs to output a result of the NAND operation. An output of the NAND gate NP1 may be a driving switching signal $N\_P_{post1}$.

A NOR gate NN1 may receive the ground voltage $V_{SS}$ and a driving signal $O\_N\_N_{post1}$ as inputs, and may perform a NOR operation on the received inputs to output a result of the NOR operation. An output of the NOR gate NN1 may be a driving switching signal $N\_N_{post1}$.

Figure 6:
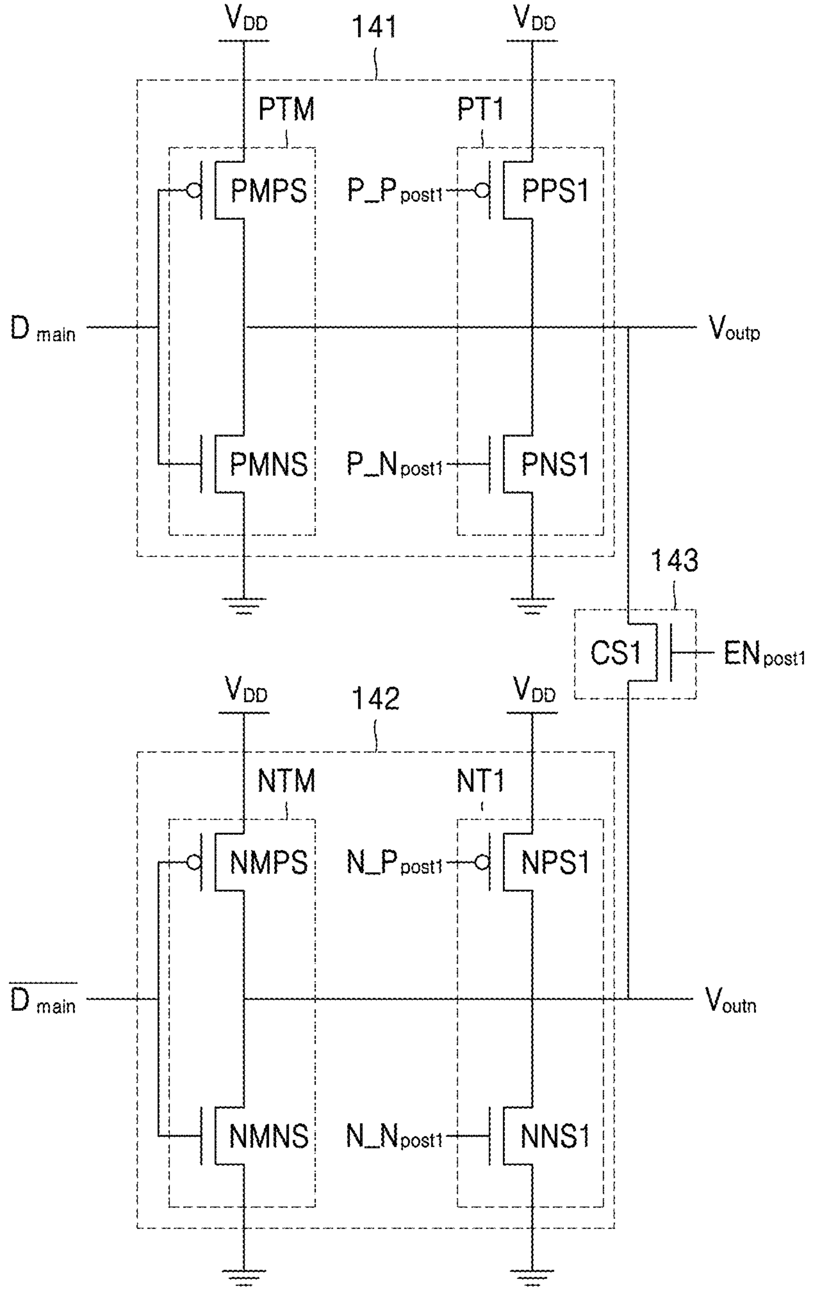
FIG. 6 is a circuit diagram illustrating an example of a driver of an equalizer according to at least one example embodiment.

FIG. 6 is a circuit diagram illustrating an example of a driver 140 of an equalizer 100 according to at least one example embodiment.

Referring to FIG. 6, the driver 140 of the equalizer 100 according to at least one example embodiment may include a first differential circuit 141, a second differential circuit 142, and/or a connection circuit 143, etc., but is not limited thereto. In the at least one example embodiment of FIG. 6, like the at least one example embodiments of FIGS. 3 to 5, the equalizer 100 including the driver 140 may be a 2-tap equalizer where two output taps are included in the driver 140, but is not limited thereto, and for example, the equalizer 100 may have a greater or lesser number of taps, etc. When the equalizer 100 is the 2-tap equalizer, the driver 140 may be configured as illustrated in FIG. 6, but is not limited thereto.

The first differential circuit 141 may generate a first differential output signal $V_{outp}$ based on a plurality of driving switching signals. The first differential circuit 141 may include a main positive output tap PTM and a post positive output tap PT1, etc.

The main positive output tap PTM and the post positive output tap PT1 may generate a first differential output signal $V_{outp}$ based on the plurality of driving switching signals.

The main positive output tap PTM may include a first output switching element PMPS and a second output switching element PMNS, but is not limited thereto. The first output switching element PMPS may be a switching element having a first polarity (for example, a positive polarity, etc.), and in at least one example embodiment, the first output switching element PMPS may be a positive-channel metal oxide semiconductor (PMOS), but is not limited thereto. The second output switching element PMNS may be a switching element having a second polarity (for example, a negative polarity, etc.), and in at least one example embodiment, the second output switching element PMNS may be a negative-channel metal oxide semiconductor (NMOS), but is not limited thereto.

The first output switching element PMPS may receive a driving switching signal $D_{main}$ through a gate terminal. The first output switching element PMPS may be connected to an operation voltage terminal $V_{DD}$ through a first terminal (for example, a drain terminal, etc.). The second output switching element PMNS may receive the driving switching signal $D_{main}$ through a gate terminal. The second output switching element PMNS may be connected to a second terminal (for example, a source terminal, etc.) of the first output switching element PMPS through a first terminal (for example, a drain terminal, etc.). Also, the second output switching element PMNS may be connected to a ground voltage terminal $V_{SS}$ through a second terminal (for example, a source terminal, etc.). Additionally, an output signal of the main positive output tap PTM may be output through the second terminal of the first output switching element PMPS and the first terminal of the second output switching element PMNS. The output signal of the main positive output tap PTM may configure the first differential output signal $V_{outp}$.

The post positive output tap PT1 may include a first output switching element PPS1 and a second output switching element PNS1, but is not limited thereto. The first output switching element PPS1 may be a switching element having the first polarity (for example, a positive polarity, etc.), and in at least one example embodiment, the first output switching element PPS1 may be a PMOS, but is not limited thereto. The second output switching element PNS1 may be a switching element having the second polarity (for example, a negative polarity, etc.), and in at least one example embodiment, the second output switching element PNS1 may be an NMOS, but is not limited thereto.

The first output switching element PPS1 may receive a driving switching signal $P\_P_{post1}$ through a gate terminal. The first output switching element PPS1 may be connected to the operation voltage terminal $V_{DD}$ through a first terminal (for example, a drain terminal, etc.). The second output switching element PNS1 may receive a driving switching signal $P\_N_{post1}$ through a gate terminal. The second output switching element PNS1 may be connected to a second terminal (for example, a source terminal, etc.) of the first output switching element PPS1 through a first terminal (for example, a drain terminal, etc.). Also, the second output switching element PNS1 may be connected to the ground voltage terminal $V_{SS}$ through a second terminal (for example, a source terminal, etc.). Additionally, an output signal of the post positive output tap PT1 may be output through the second terminal of the first output switching element PPS1 and the first terminal of the second output switching element PNS1. The output signal of the post positive output tap PT1 may configure the first differential output signal $V_{outp}$.

An output signal of the main positive output tap PTM and an output signal of the post positive output tap PT1 may be summated to configure the first differential output signal $V_{outp}$.

The second differential circuit 142 may generate a second differential output signal $V_{outn}$ based on the plurality of driving switching signals. The second differential circuit 142 may include a main negative output tap NTM and a post negative output tap NT1, but is not limited thereto.

The main negative output tap NTM and the post negative output tap NT1 may generate a second differential output signal $V_{outn}$ based on the plurality of driving switching signals.

The main negative output tap NTM may include a first output switching element NMPS and a second output switching element NMNS, etc. The first output switching element NMPS may be a switching element having the first polarity (for example, a positive polarity, etc.), and in at least one example embodiment, the first output switching element NMPS may be a PMOS, but is not limited thereto. The second output switching element NMNS may be a switching element having the second polarity (for example, a negative polarity, etc.), and in at least one example embodiment, the second output switching element NMNS may be an NMOS, but is not limited thereto.

The first output switching element NMPS may receive a driving switching signal $\overline{D_{main}}$ through a gate terminal. The first output switching element NMPS may be connected to the operation voltage terminal $V_{DD}$ through a first terminal (for example, a drain terminal, etc.). The second output switching element NMNS may receive the driving switching signal $\overline{D_{main}}$ through a gate terminal. The second output switching element NMNS may be connected to a second terminal (for example, a source terminal, etc.) of the first output switching element NMPS through a first terminal (for example, a drain terminal, etc.). Also, the second output switching element NMNS may be connected to the ground voltage terminal $V_{SS}$ through a second terminal (for example, a source terminal, etc.). Additionally, an output signal of the main negative output tap NTM may be output through the second terminal of the first output switching element NMPS and the first terminal of the second output switching element NMNS. The output signal of the main negative output tap NTM may configure the second differential output signal $V_{outn}$.

The post negative output tap NT1 may include a first output switching element NPS1 and a second output switching element NNS1, but is not limited thereto. The first output switching element NPS1 may be a switching element having the first polarity (for example, a positive polarity, etc.), and in at least one example embodiment, the first output switching element NPS1 may be a PMOS, but is not limited thereto. The second output switching element NNS1 may be a switching element having the second polarity (for example, a negative polarity, etc.), and in at least one example embodiment, the second output switching element NNS1 may be an NMOS, but is not limited thereto.

The first output switching element NPS1 may receive a driving switching signal $N\_P_{post1}$ through a gate terminal. The first output switching element NPS1 may be connected to the operation voltage terminal $V_{DD}$ through a first terminal (for example, a drain terminal, etc.). The second output switching element NNS1 may receive a driving switching signal $N\_N_{post1}$ through a gate terminal. The second output switching element NNS1 may be connected to a second terminal (for example, a source terminal, etc.) of the first output switching element NPS1 through a first terminal (for example, a drain terminal, etc.). Also, the second output switching element NNS1 may be connected to the ground voltage terminal $V_{SS}$ through a second terminal (for example, a source terminal, etc.). Additionally, an output signal of the post negative output tap NT1 may be output through the second terminal of the first output switching element NPS1 and the first terminal of the second output switching element NNS1. The output signal of the post negative output tap NT1 may configure the second differential output signal $V_{outn}$.

An output signal of the main negative output tap NTM and an output signal of the post negative output tap NT1 may be summated to configure the second differential output signal $V_{outn}$.

According to at least one example embodiment, the first output switching element PMPS included in the main positive output tap PTM, the second output switching element PMNS included in the main positive output tap PTM, the first output switching element NMPS included in the main negative output tap NTM, and the second output switching element NMNS included in the main negative output tap NTM may have the same coefficient. That is, the main positive output tap PTM and the main negative output tap NTM may have the same coefficient.

Also, the first output switching element PPS1 included in the post positive output tap PT1, the second output switching element PNS1 included in the post positive output tap PT1, the first output switching element NPS1 included in the post negative output tap NT1, and the second output switching element NNS1 included in the post negative output tap NT1 may have the same coefficient. That is, the post positive output tap PT1 and the post negative output tap NT1 may have the same coefficient.

The connection circuit 143 may adjust a connection between the first differential circuit 141 and the second differential circuit 142 based on a connection switching signal.

The connection circuit 143 may include a connection switching element CS1, but is not limited thereto. The connection switching element CS1 may adjust a connection between the post positive output tap PT1 and the post negative output tap NT1 based on a connection switching signal $EN_{post1}$.

The connection switching element CS1 may be a switching element having the second polarity (for example, a negative polarity, etc.), and in at least one example embodiment, the connection switching element CS1 may be an NMOS, but is not limited thereto.

The connection switching element CS1 may receive the connection switching signal $EN_{post1}$ through a gate terminal. The connection switching element CS1 may be connected to, through a first terminal (for example, a drain terminal, etc.), a node between the first output switching element PPS1 included in the post positive output tap PT1 and the second output switching element PNS1 included in the post positive output tap PT1. The connection switching element CS1 may be connected to, through a second terminal (for example, a source terminal, etc.), a node between the first output switching element NPS1 included in the post negative output tap NT1 and the second output switching element NNS1 included in the post negative output tap NT1.

In at least one example embodiment, when the post positive output tap PT1 and the post negative output tap NT1 are in an off state, the connection switching element CS1 may connect the post positive output tap PT1 to the post negative output tap NT1. Also, the connection switching element CS1 may have the same coefficient as that of a plurality of switching elements included in each of the post positive output tap PT1 and the post negative output tap NT1. Therefore, even when the post positive output tap PT1 and the post negative output tap NT1 are in an off state, an output resistance based on the driver 140 may be maintained, and thus, impedance matching may be accurately performed and/or impedance matching of the driver 140 may be improved, etc.

Figure 7A:
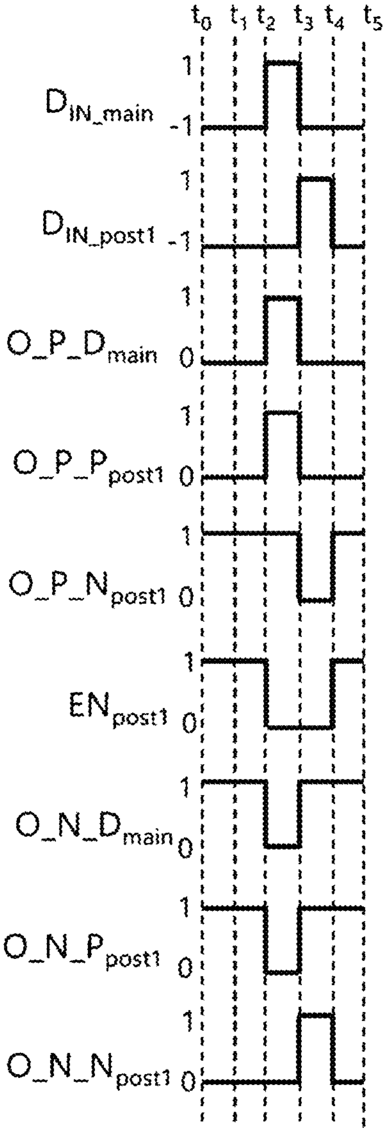
FIGS. 7A to 7C are graphs showing outputs of circuits with respect to a signal applied to the equalizer illustrated in FIGS. 3 to 6 according to some example embodiments.
Figure 7B:
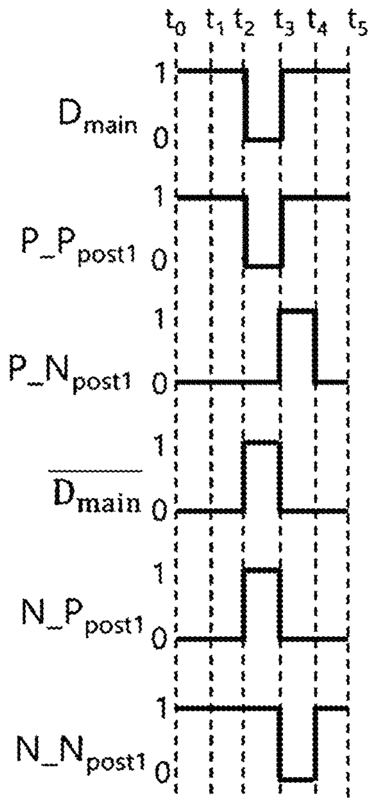
Figure 7C:
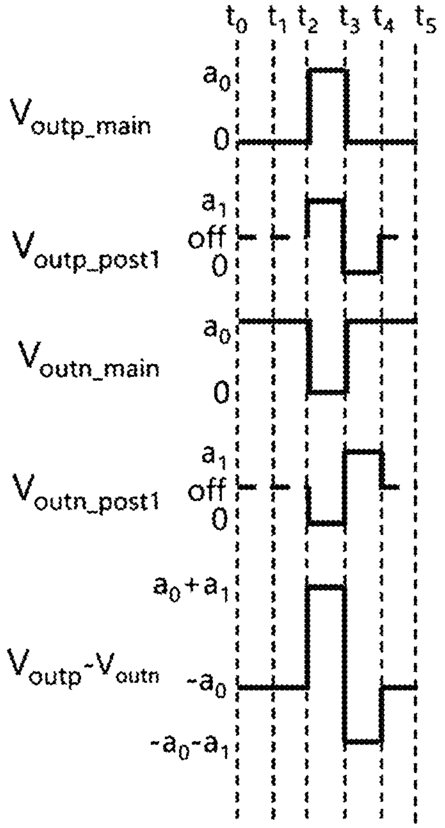

FIGS. 7A to 7C are graphs showing outputs of circuits with respect to a signal applied to the equalizer illustrated in FIGS. 3 to 6 according to some example embodiments.

Referring to FIG. 7A, the equalizer 100 may have a structure according to one or more example embodiments of FIGS. 3 to 6, and when an input signal IN input to the delay circuit 110 of the equalizer 100 has a value of 1 at a time interval between $t_2$ and $t_3$ and has a value of −1 at all other time intervals, values of the signals output from the delay circuit 110 and the encoding circuit 120 may be checked and/or evaluated, etc., but is not limited thereto. It is assumed in FIG. 7A, that an interval between $t_0$ and $t_1$, an interval between $t_1$ and $t_2$, an interval between $t_2$ and $t_3$, an interval between $t_3$ and $t_4$, and an interval between $t_4$ and $t_5$ are equal to one another.

The delay circuit 110 may output a reference input signal $D_{IN\_main}$ which is the same as the input signal IN. Also, the delay circuit 110 may delay the input signal IN through the latch 111 to output, as a first post input signal $D_{IN\_post1}$, a signal which has a value of 1 at during the time interval between $t_3$ and $t_4$ and has a value of −1 at all other time intervals.

The encoding circuit 120 may perform a NOR operation on a ground voltage $V_{SS}$ and a reference input signal $D_{IN\_main}$ by using the NOR gate IP and may perform a NOR operation on the ground voltage $V_{SS}$ and an output signal of the NOR gate IP by using the NOR gate OPM and may thus output a driving signal $O\_P\_D_{main}$ which has a value of 1 during a time interval between $t_2$ and $t_3$ and has a value of 0 at all other time intervals.

The encoding circuit 120 may perform a NOR operation on the first post input signal $D_{IN\_post1}$ and an output signal of the NOR gate IP by using the NOR gate OPP1 to output a driving signal $O\_P\_P_{post1}$ which has a value of 1 at a time interval between $t_2$ and $t_3$ and has a value of 0 at all other time intervals.

The encoding circuit 120 may perform a NAND operation on the first post input signal $D_{IN\_post1}$ and an output signal of the NOR gate IP by using the NAND gate OPN1 to output a driving signal $O\_P\_N_{post1}$ which has a value of 0 at a time interval between $t_3$ and $t_4$ and has a value of 1 at all other time intervals.

The encoding circuit 120 may perform an XOR operation on an output signal of the NOR gate OPP1 and an output signal of the NAND gate OPN1 by using the XOR gate X1 to output a connection switching signal $EN_{post1}$ which has a value of 0 at a time interval between $t_2$ and $t_4$ and has a value of 1 at all other time intervals.

The encoding circuit 120 may perform a NOR operation on the ground voltage $V_{SS}$ and the reference input signal $D_{IN\_main}$ by using the NOR gate ONM to output a driving signal $O\_N\_D_{main}$ which has a value of 0 at a time interval between $t_2$ and $t_3$ and has a value of 1 at all other time intervals.

The encoding circuit 120 may perform a NOR operation on the ground voltage $V_{SS}$ and the first post input signal $D_{IN\_post1}$ by using the NOR gate IN1 and may perform a NOR operation on the reference input signal $D_{IN\_main}$ and an output signal of the NOR gate IN1 by using the NOR gate ONP1 and may thus output a driving signal $O\_N\_P_{post1}$ which has a value of 0 at a time interval between $t_2$ and $t_3$ and has a value of 1 at all other time intervals.

The encoding circuit 120 may perform a NAND operation on the reference input signal $D_{IN\_main}$ and the output signal of the NOR gate IN1 by using the NAND gate ONN1 to output a driving signal $O\_N\_N_{post1}$ which has a value of 1 at a time interval between $t_3$ and $t_4$ and has a value of 0 at all other time intervals.

Referring to FIG. 7B, the equalizer 100 may have a structure according to one or more example embodiments of FIGS. 3 to 6, and when a plurality of driving signals applied to the pre-driver 130 of the equalizer 100 are as illustrated in FIG. 7A, values of signals output from the pre-driver 130 may be checked and/or evaluated.

As described above with reference to FIG. 5, the pre-driver 130 may invert the plurality of driving signals to generate and output a plurality of driving switching signals.

The pre-driver 130 may invert a driving signal $O\_P\_D_{main}$ by using the NOR gate PM to output a driving switching signal $D_{main}$ which has a value of 0 at a time interval between $t_2$ and $t_3$ and has a value of 1 at all other time intervals.

The pre-driver 130 may invert a driving signal $O\_P\_P_{post1}$ by using the NAND gate PP1 to output a driving switching signal $P\_P_{post1}$ which has a value of 0 at a time interval between $t_2$ and $t_3$ and has a value of 1 at all other time intervals.

The pre-driver 130 may invert a driving signal $O\_P\_N_{post1}$ by using the NOR gate PN1 to output a driving switching signal $P\_N_{post1}$ which has a value of 1 at a time interval between $t_3$ and $t_4$ and has a value of 0 at all other time intervals.

The pre-driver 130 may invert a driving signal $O\_N\_D_{main}$ by using the NOR gate NM to output a driving switching signal $\overline{D_{main}}$ which has a value of 1 at a time interval between $t_2$ and $t_3$ and has a value of 0 at all other time intervals.

The pre-driver 130 may invert a driving signal $O\_N\_P_{post1}$ by using the NAND gate NP1 to output a driving switching signal $N\_P_{post1}$ which has a value of 1 at a time interval between $t_2$ and $t_3$ and has a value of 0 at all other time intervals.

The pre-driver 130 may invert a driving signal $O\_N\_N_{post1}$ by using the NOR gate NN1 to output a driving switching signal $N\_N_{post1}$ which has a value of 0 at a time interval between $t_3$ and $t_4$ and has a value of 1 at all other time intervals.

Referring to FIG. 7C, the equalizer 100 may have a structure according to one or more of the example embodiments of FIGS. 3 to 6, and when a plurality of driving switching signals applied to the driver 140 of the equalizer 100 are as illustrated in FIG. 7B, values of signals output from the driver 140 may be checked and/or evaluated. In this case, in the driver 140, the main positive output tap PTM and the main negative output tap NTM may have $a_0$ as a coefficient, and the post positive output tap PT1 and the post negative output tap NT1 may have $a_1$ as a coefficient, but are not limited thereto.

The first output switching element PMPS included in the main positive output tap PTM may be turned on at a time interval between $t_2$ and $t_3$ based on the driving switching signal $D_{main}$. The second output switching element PMNS included in the main positive output tap PTM may be turned off at a time interval between $t_2$ and $t_3$ based on the driving switching signal $D_{main}$. Therefore, an output signal $V_{outp\_main}$ of the main positive output tap PTM may have a value of $a_0$ at a time interval between $t_2$ and $t_3$ and may have a value of 0 at all other time intervals.

The first output switching element PPS1 included in the post positive output tap PT1 may be turned on at a time interval between $t_2$ and $t_3$ based on the driving switching signal $P\_P_{post1}$. The second output switching element PNS1 included in the post positive output tap PT1 may be turned on at a time interval between $t_3$ and $t_4$ based on the driving switching signal $P\_N_{post1}$. Therefore, an output signal $V_{outp\_post1}$ of the post positive output tap PT1 may have a value of $a_1$ at a time interval between $t_2$ and $t_3$, may have a value of 0 at a time interval between $t_3$ and $t_4$, and may be in an off state with no output at all other time intervals.

The third output switching element NMPS included in the main negative output tap NTM may be turned off at a time interval between $t_2$ and $t_3$ based on a driving switching signal $\overline{D_{main}}$. The fourth output switching element NMNS included in the main negative output tap NTM may be turned on at a time interval between $t_2$ and $t_3$ based on a driving switching signal $\overline{D_{main}}$. Therefore, an output signal $V_{outn\_main}$ of the main negative output tap NTM may have a value of 0 at a time interval between $t_2$ and $t_3$ and may have a value of $a_0$ at all other time intervals.

The third output switching element NPS1 included in the post negative output tap NT1 may be turned off at a time interval between $t_2$ and $t_3$ based on a driving switching signal $N\_P_{post1}$. The fourth output switching element NNS1 included in the post negative output tap NT1 may be turned off at a time interval between $t_3$ and $t_4$ based on a driving switching signal $N\_N_{post1}$. Therefore, an output signal $V_{outn\_post1}$ of the post negative output tap NT1 may have a value of 0 at a time interval between $t_2$ and $t_3$, may have a value of $a_1$ at a time interval between $t_3$ and $t_4$, and may be in an off state with no output at all other time intervals.

Accordingly, an output signal $V_{outp\_main}$ of the main positive output tap PTM and an output signal $V_{outp\_post1}$ of the post positive output tap PT1 may be summated to configure a first differential output signal $V_{outp}$, and an output signal $V_{out\_main}$ of the main negative output tap NTM and an output signal $V_{outn\_post1}$ of the post negative output tap NT1 may be summated to configure a second differential output signal $V_{outn}$. At this time, the difference between the first differential output signal $V_{outp}$ and the second differential output signal $V_{outn}$, which are the final output signals of the equalizer 100, may have a value of $-a_0$ at a time interval between to and $t_2$, may have a value of $a_0+a_1$ at a time interval between $t_2$ and $t_3$, may have a value of $-a_0-a_1$ at a time interval between $t_3$ and $t_4$, and may have a value of $-a_0$ at a time interval between $t_4$ and $t_5$.

Figure 8:
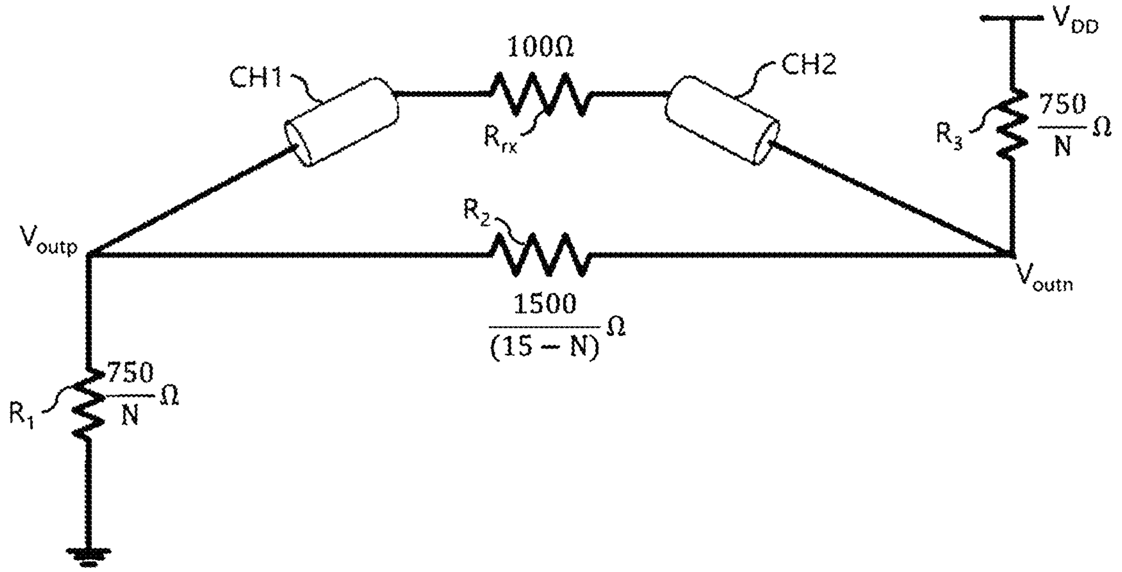
FIG. 8 is a circuit diagram illustrating a resistor equivalent circuit of a driver of an equalizer according to at least one example embodiment.

FIG. 8 is a circuit diagram illustrating a resistor equivalent circuit of a driver 140 of an equalizer 100 according to at least one example embodiment.

Referring to FIG. 8, when the equalizer 100 has a structure according to one or more of the example embodiments of FIGS. 3 to 6, the resistor equivalent circuit of the driver 140 of the equalizer 100 may be checked and/or evaluated. In this case, N may be a coefficient of a main positive output tap PTM and a main negative output tap NTM, and (15-N) may be a coefficient of a post positive output tap PT1 and a post negative output tap NT1.

In this case, the output resistance of the driver 140 may be expressed using the following Equation 1, but the example embodiments are not limited thereto.

$$\text{Impedance}_{out} = \frac{1}{\frac{1}{750/N} + \frac{1}{750/(15-N)}} = 50 \quad \text{[Equation 1]}$$

That is, it may be seen that an output resistance $\text{Impedance}_{out}$ is constant regardless of the coefficient of the main positive output tap PTM and the main negative output tap NTM, the coefficient of the post positive output tap PT1 and the post negative output tap NT1, and statuses of switching elements included in the driver 140.

As described above, by using the equalizer 100 according to at least one example embodiment, an output resistance may be maintained, and thus, impedance matching may be accurately performed and/or improved impedance matching may be achieved, thereby decreasing and/or preventing the reflection and/or distortion of a signal, etc.

Figure 9:
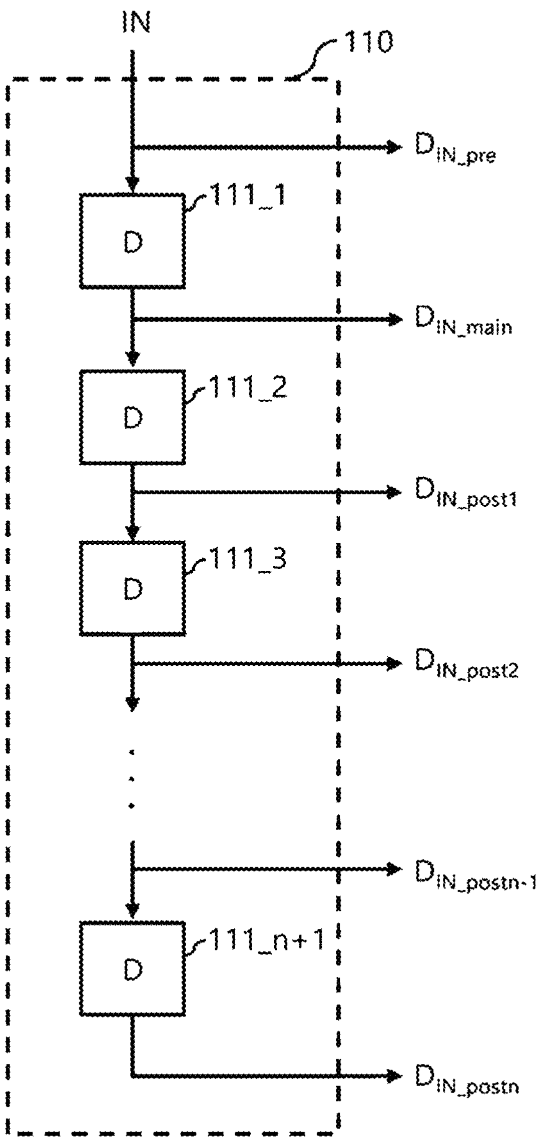
FIG. 9 is a circuit diagram illustrating another example of a delay circuit of an equalizer according to at least one example embodiment.

FIG. 9 is a circuit diagram illustrating another example of a delay circuit 110 of an equalizer 100 according to at least one example embodiment.

Referring to FIG. 9, the delay circuit 110 of the equalizer 100 according to at least one example embodiment may include a plurality of latches 111_1 to 111_*n*+1. In the at least one example embodiment of FIG. 9, the equalizer 100 including the delay circuit 110 may be an (n+2)-tap equalizer where n+2 number of output taps are included in a driver 140. When the equalizer 100 is the (n+2)-tap equalizer, the delay circuit 110 may include *n*+1 number of latches 111_1 to 111_*n*+1.

The delay circuit 110 of the equalizer 100 according to at least one example embodiment may include the plurality of latches 111_1 to 111_*n*+1 (where n may be a natural number). The plurality of latches 111_1 to 111_*n*+1 may delay an input signal IN for a desired and/or predetermined delay time D to generate a delay signal. For example, when the input signal IN is x[0] and the delay time D of each of the plurality of latches 111_1 to 111_*n*+1 is 1, each of the plurality of latches 111_1 to 111_*n*+1 may output x[1], x[2], and x[*n*+1] obtained through 1-time delay.

In the at least one example embodiment of FIG. 9, the delay circuit 110 may output the input signal IN, which does not pass through the plurality of latches 111_1 to 111_*n*+1, as an input signal $D_{IN\_pre}$ to the encoding circuit 120. The delay circuit 110 may output the input signal IN, passing through a first latch 111_1 of the plurality of latches 111_1 to 111_*n*+1, as a reference input signal $D_{IN\_main}$ to the encoding circuit 120. The delay circuit 110 may output the input signal IN, passing through the first latch 111_1 and a second latch 111_2 of the plurality of latches 111_1 to 111_*n*+1, as a first post input signal $D_{IN\_post1}$ to the encoding circuit 120. Likewise, the delay circuit 110 may output the input signal IN, passing through a nth latch 111_*n* (not shown) of the plurality of latches 111_1 to 111_*n*+1, as a nth post input signal $D_{IN\_postn-1}$ to the encoding circuit 120.

Figure 10A:
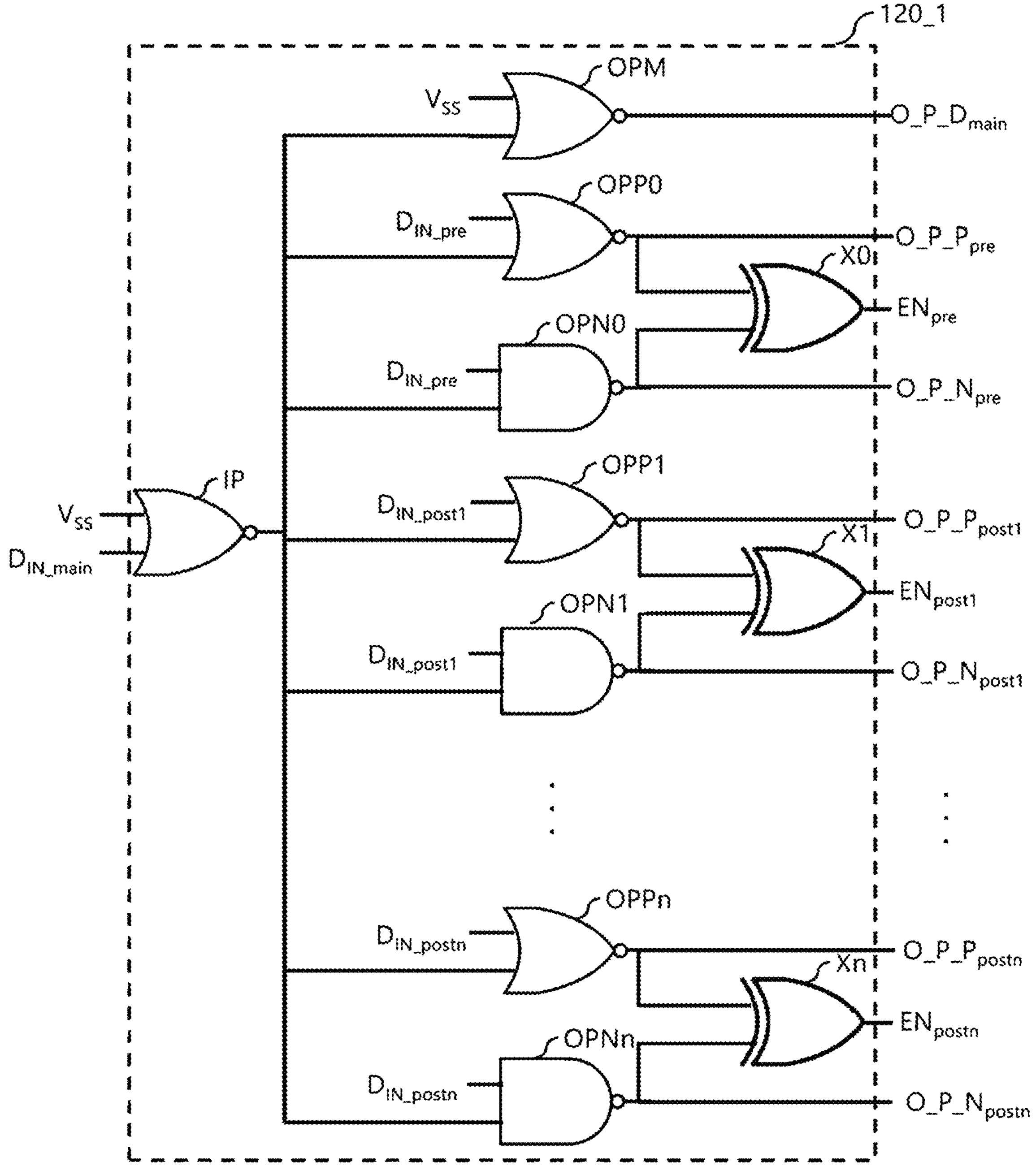
FIGS. 10A and 10B are circuit diagrams illustrating another example of an encoding circuit of an equalizer according to at least one example embodiment.
Figure 10B:
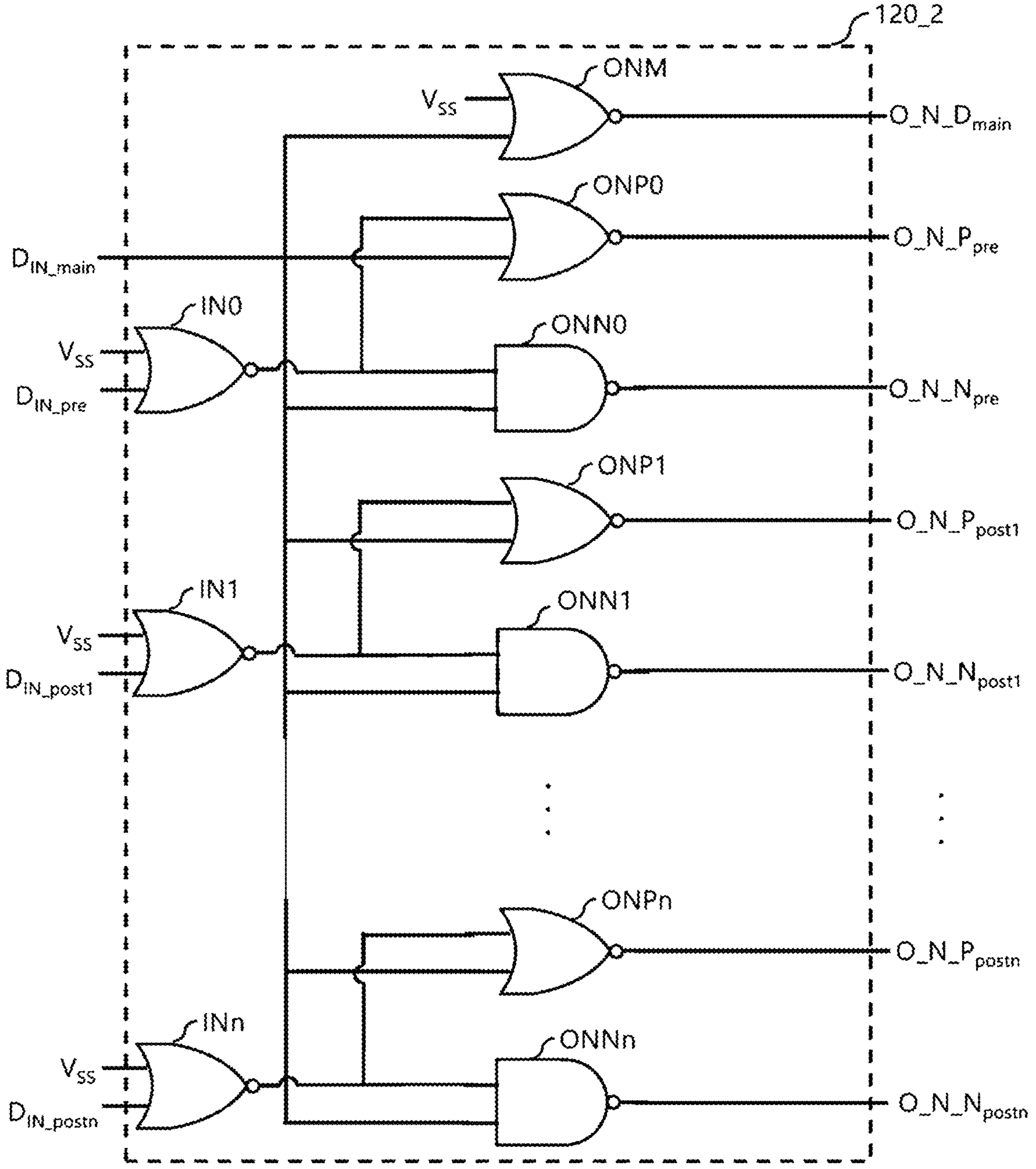

FIGS. 10A and 10B are circuit diagrams illustrating another example of an encoding circuit 120 of an equalizer 100 according to at least one example embodiment.

Referring to FIGS. 10A and 10B, the encoding circuit 120 of the equalizer 100 according to at least one example embodiment may include a plurality of NOR gates, a plurality of NAND gates, and/or an XOR gate, etc., but is not limited thereto. In the at least one example embodiment of FIGS. 10A and 10B, like the at least one example embodiment of FIG. 9, the equalizer 100 including the encoding circuit 120 may be an (n+2)-tap equalizer where n+2 number of output taps are included in a driver 140, but the example embodiments are not limited thereto. When the equalizer 100 is the (n+2)-tap equalizer, the encoding circuit 120 may be configured as illustrated in FIGS. 10A and 10B, but is not limited thereto.

First, referring to FIG. 10A, a NOR gate IP, a NOR gate OPM, a NOR gate OPP1, a NAND gate OPN1, and/or an XOR gate X1 may respectively perform the same operations as the operations described above with reference to FIG. 4 and thus description of these components will be omitted for the sake of clarity and brevity, but the example embodiments are not limited thereto.

A NOR gate OPP0 may receive a pre-input signal $D_{IN\_pre}$ and an output signal of the NOR gate IP as inputs, and may perform a NOR operation on the received inputs to output a result of the NOR operation. An output of the NOR gate OPP0 may be a driving signal $O\_P\_P_{pre}$.

A NAND gate OPN0 may receive the pre-input signal $D_{IN\_pre}$ and the output signal of the NOR gate IP as inputs, and may perform a NAND operation on the received inputs to output a result of the NAND operation. An output of the NAND gate OPN0 may be a driving signal $O\_P\_N_{pre}$.

A NOR gate OPPn (where n may be a natural number of 1 to n) may receive an $n^{th}$ post input signal $D_{IN\_postn}$ and an output signal of the NOR gate IP as inputs, and may perform a NOR operation on the received inputs to output a result of the NOR operation. An output of the NOR gate OPPn may be a driving signal $O\_P\_P_{postn}$.

A NAND gate OPNn may receive the $n^{th}$ post input signal $D_{IN\_postn}$ and the output signal of the NOR gate IP as inputs, and may perform a NAND operation on the received inputs to output a result of the NAND operation. An output of the NAND gate OPNn may be a driving signal $O\_P\_N_{postn}$.

An XOR gate X0 may receive, as inputs, a driving signal $O\_P\_P_{pre}$ and a driving signal $O\_P\_N_{pre}$ each generated based on the pre-input signal $D_{IN\_pre}$ and may perform an XOR operation on the received inputs to output a result of the XOR operation. An output of the XOR gate X0 may be a connection switching signal $EN_{pre}$.

An XOR gate Xn may receive, as inputs, a driving signal $O\_P\_P_{postn}$ and a driving signal $O\_P\_N_{postn}$ each generated based on the $n^{th}$ post input signal $D_{IN\_postn}$ and may perform an XOR operation on the received inputs to output a result of the XOR operation. An output of the XOR gate Xn may be a connection switching signal $EN_{postn}$.

Next, referring to FIG. 10B, a NOR gate IN1, a NOR gate ONM, a NOR gate ONP1, and a NAND gate ONN1 may respectively perform the same operations as the operations described above with reference to FIG. 4 and thus description of these components will be omitted for the sake of clarity and brevity, but the example embodiments are not limited thereto.

A NOR gate INn may receive a ground voltage $V_{SS}$ and the pre-input signal $D_{IN\_postn}$ as inputs, and may perform a NOR operation on the received inputs to output a result of the NOR operation.

A NOR gate ONPn may receive a reference input signal $D_{IN\_main}$ and an output signal of the NOR gate INn as inputs, and may perform a NOR operation on the received inputs to output a result of the NOR operation. An output of the NOR gate ONPn may be a driving signal $O\_N\_P_{postn}$.

A NAND gate ONNn may receive the reference input signal $D_{IN\_main}$ and the output signal of the NOR gate INn as inputs, and may perform a NAND operation on the received inputs to output a result of the NAND operation. An output of the NAND gate ONNn may be a driving signal $O\_N\_N_{postn}$.

Figure 11:
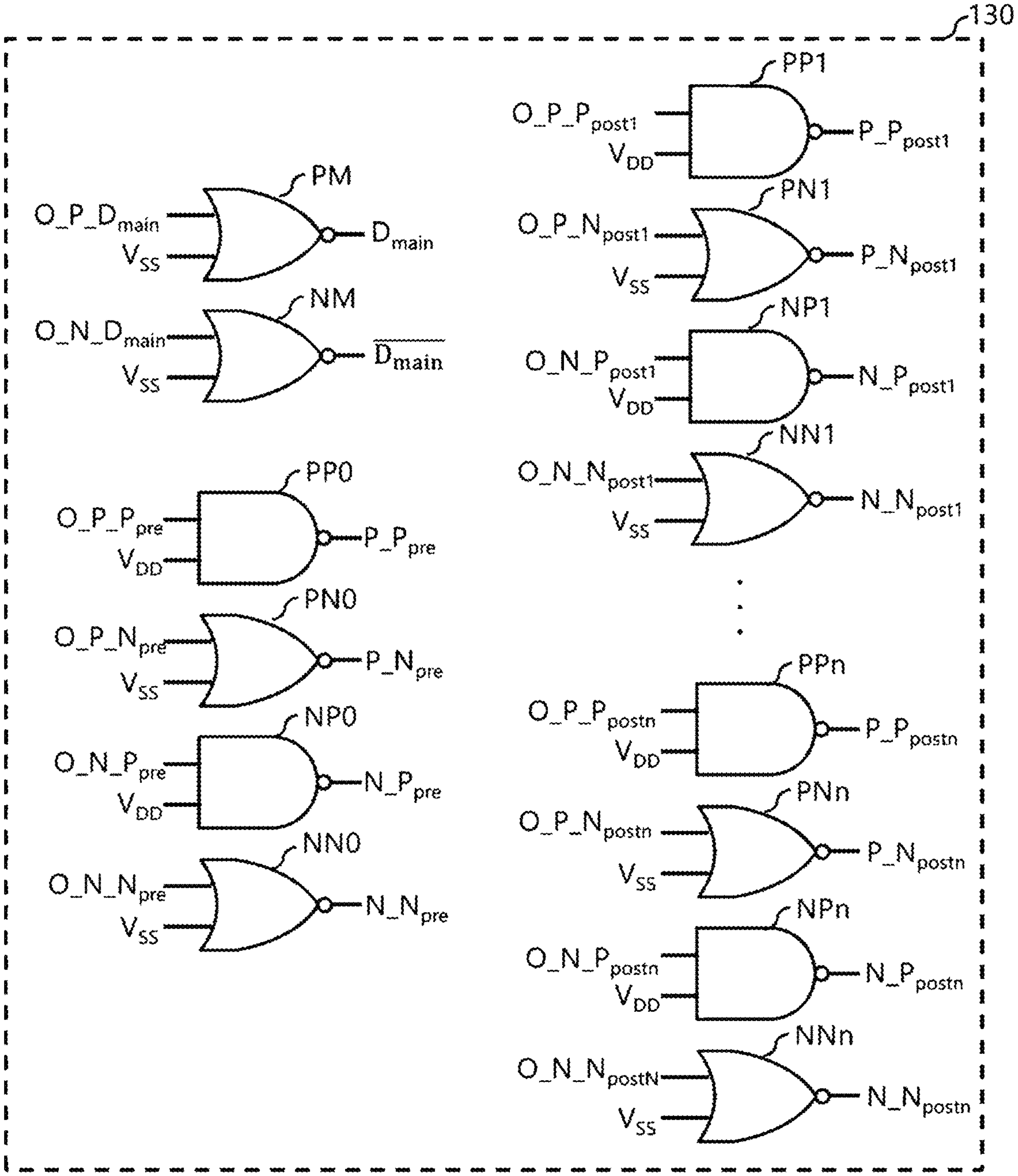
FIG. 11 is a circuit diagram illustrating another example of a pre-driver of an equalizer according to at least one example embodiment.

FIG. 11 is a circuit diagram illustrating another example of a pre-driver 130 of an equalizer 100 according to at least one example embodiment.

Referring to FIG. 11, the pre-driver 130 of the equalizer 100 according to at least one example embodiment may include a plurality of NOR gates and a plurality of NAND gates, but is not limited thereto. In the at least one example embodiment of FIG. 11, like the at least one example embodiments of FIGS. 9, 10A, and 10B, the equalizer 100 including the pre-driver 130 may be an (n+2)-tap equalizer where n+2 number of output taps are included in a driver 140, etc. When the equalizer 100 is the (n+2)-tap equalizer, the pre-driver 130 may be configured as illustrated in FIG. 11, but is not limited thereto.

A NOR gate PM, a NAND gate PP1, a NOR gate PN1, a NOR gate NM, a NAND gate NP1, and a NOR gate NN1 may respectively perform the same operations as the operations described above with reference to FIG. 5 and thus description of these components will be omitted for the sake of clarity and brevity, but the example embodiments are not limited thereto.

A NAND gate PP0 may receive an operation voltage $V_{DD}$ and a driving signal $O\_P\_P_{pre}$ as inputs, and may perform a NAND operation on the received inputs to output a result of the NAND operation. An output of the NAND gate PP0 may be a driving switching signal $P\_P_{pre}$.

A NOR gate PN0 may receive a ground voltage $V_{SS}$ and a driving signal $O\_P\_N_{pre}$ as inputs, and may perform a NOR operation on the received inputs to output a result of the NOR operation. An output of the NOR gate PN0 may be a driving switching signal $P\_N_{pre}$.

A NAND gate NP0 may receive the operation voltage $V_{DD}$ and a driving signal $O\_N\_P_{pre}$ as inputs, and may perform a NAND operation on the received inputs to output a result of the NAND operation. An output of the NAND gate NP0 may be a driving switching signal $N_P_{p}$re.

A NOR gate NN0 may receive the ground voltage $V_{SS}$ and the driving signal $O\_N\_N_{pre}$ as inputs, and may perform a NOR operation on the received inputs to output a result of the NOR operation. An output of the NOR gate NN0 may be a driving switching signal $N\_N_{pre}$.

A NAND gate PPn may receive the operation voltage $V_{DD}$ and a driving signal $O\_P\_P_{postn}$ as inputs, and may perform a NAND operation on the received inputs to output a result of the NAND operation. An output of the NAND gate PPn may be a driving switching signal $P\_P_{postn}$.

A NOR gate PNn may receive the ground voltage $V_{SS}$ and a driving signal $O\_P\_N_{postn}$ as inputs, and may perform a NOR operation on the received inputs to output a result of the NOR operation. An output of the NOR gate PNn may be a driving switching signal $P\_N_{postn}$.

A NAND gate NPn may receive the operation voltage $V_{DD}$ and a driving signal $O\_N\_P_{postn}$ as inputs, and may perform a NAND operation on the received inputs to output a result of the NAND operation. An output of the NAND gate NPn may be a driving switching signal $N\_P_{postn}$.

A NOR gate NNn may receive the ground voltage $V_{SS}$ and a driving signal $O\_N\_N_{postn}$ as inputs, and may perform a NOR operation on the received inputs to output a result of the NOR operation. An output of the NOR gate NNn may be a driving switching signal $N\_N_{postn}$.

Figure 12:
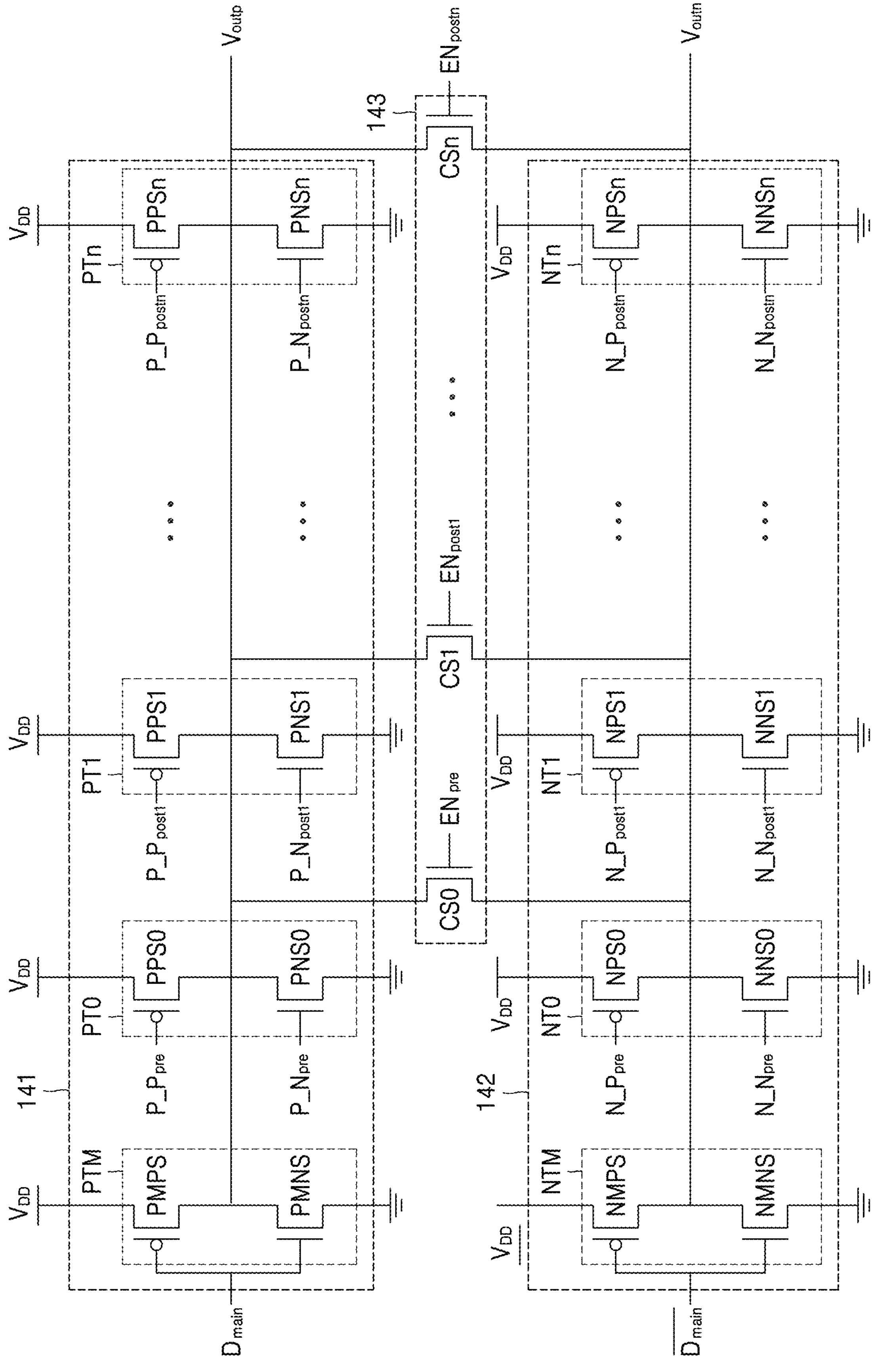
FIG. 12 is a circuit diagram illustrating another example of a driver of an equalizer according to at least one example embodiment.

FIG. 12 is a circuit diagram illustrating another example of a driver 140 of an equalizer 100 according to at least one example embodiment.

Referring to FIG. 12, the driver 140 of the equalizer 100 according to at least one example embodiment may include a first differential circuit 141, a second differential circuit 142, and/or a connection circuit 143, etc., but is not limited thereto. In the at least one example embodiment of FIG. 12, like the at least one example embodiments of FIGS. 9 to 11, the equalizer 100 including the driver 140 may be an (n+2)-tap equalizer where (n+2) number of output taps are included in the driver 140, but is not limited thereto. When the equalizer 100 is the (n+2)-tap equalizer, the driver 140 may be configured as illustrated in FIG. 12, but is not limited thereto.

The first differential circuit 141 may include a plurality of positive output taps PTM and PT0 to PTn. The plurality of positive output taps PTM and PT0 to PTn may generate a first differential output signal $V_{outp}$ based on a plurality of driving switching signals.

A structure and an operation of each of a main positive output tap PTM and a first post positive output tap PT1 may be as described above with reference to FIG. 6, and therefore a description thereof will be omitted for the sake of clarity and brevity, but the example embodiments are not limited thereto.

A pre positive output tap PT0 may include a first output switching element PPS0 and a second output switching element PNS0. The first output switching element PPS0 may be a switching element having the first polarity (for example, a positive polarity, etc.). The second output switching element PNS0 may be a switching element having the second polarity (for example, a negative polarity, etc.).

The first output switching element PPS0 may receive a driving switching signal $P\_P_{pre}$ through a gate terminal. The second output switching element PNS0 may receive a driving switching signal $P\_N_{pre}$ through a gate terminal. A structure and an operation of each of the first output switching element PPS0 and the second output switching element PNS0 of the pre positive output tap PT0 may be the same as a structure and an operation of each of the first output switching element PPS1 and the second output switching element PNS1 of the first post positive output tap PT1, but is not limited thereto.

An output signal of the pre positive output tap PT0 may be output through a second terminal of the first output switching element PPS0 and a first terminal of the second output switching element PNS0 of the pre positive output tap PT0. The output signal of the pre positive output tap PT0 may configure the first differential output signal $V_{outp}$.

An $n^{th}$ post positive output tap PTn may include a first output switching element PPSn and a second output switching element PNSn. The first output switching element PPSn may be a switching element having the first polarity (for example, a positive polarity, etc.). The second output switching element PNSn may be a switching element having the second polarity (for example, a negative polarity, etc.).

The first output switching element PPSn may receive a driving switching signal $P\_P_{postn}$ through a gate terminal. The second output switching element PNSn may receive a driving switching signal $P\_N_{postn}$ through a gate terminal. A structure and an operation of each of the first output switching element PPSn and the second output switching element PNSn of the $n^{th}$ post positive output tap PTn may be the same as a structure and an operation of each of the first output switching element PPS1 and the second output switching element PNS1 of the first post positive output tap PT1, but are not limited thereto.

An output signal of the $n^{th}$ post positive output tap PTn may be output through a second terminal of the first output switching element PPSn and a first terminal of the second output switching element PNSn of the $n^{th}$ post positive output tap PTn. The output signal of the $n^{th}$ post positive output tap PTn may configure the first differential output signal $V_{outp}$.

An output signal of the main positive output tap PTM, an output signal of the pre positive output tap PT0, and output signals of the first to $n^{th}$ post positive output taps PT1 to PTn may be summated to configure the first differential output signal $V_{outp}$.

The second differential circuit 142 may include a plurality of negative output taps NTM and NT0 to NTn. The plurality of negative output taps NTM and NT0 to NTn may generate a second differential output signal $V_{outn}$, based on a plurality of driving switching signals.

A structure and an operation of each of a main negative output tap NTM and a first post negative output tap NT1 may be as described above with reference to FIG. 6 and therefore a description thereof will be omitted for the sake of clarity and brevity, but the example embodiments are not limited thereto.

A pre negative output tap NT0 may include a first output switching element NPS0 and a second output switching element NNS0. The first output switching element NPS0 may be a switching element having the first polarity (for example, a positive polarity, etc.). The second output switching element NNS0 may be a switching element having the second polarity (for example, a negative polarity, etc.).

The first output switching element NPS0 may receive a driving switching signal $N\_P_{pre}$ through a gate terminal. The second output switching element NNS0 may receive a driving switching signal $N\_N_{pre}$ through a gate terminal. A structure and an operation of each of the first output switching element NPS0 and the second output switching element NNS0 of the pre negative output tap NT0 may be the same as a structure and an operation of each of the first output switching element NPS1 and the second output switching element NNS1 of the first post negative output tap NT1, but are not limited thereto.

An output signal of the pre negative output tap NT0 may be output through a second terminal of the first output switching element NPS0 and a first terminal of the second output switching element NNS0 of the pre negative output tap NT0. The output signal of the pre negative output tap NT0 may configure the second differential output signal $V_{outn}$.

An $n^{th}$ post negative output tap NTn may include a first output switching element NPSn and a second output switching element NNSn. The first output switching element NPSn may be a switching element having the first polarity (for example, a positive polarity, etc.). The second output switching element NNSn may be a switching element having the second polarity (for example, a negative polarity, etc.).

The first output switching element NPSn may receive a driving switching signal $N\_P_{postn}$ through a gate terminal. The second output switching element NNSn may receive a driving switching signal $N\_N_{postn}$ through a gate terminal. A structure and an operation of each of the first output switching element NPSn and the second output switching element NNSn of the $n^{th}$ post negative output tap NTn may be the same as a structure and an operation of each of the first output switching element NPS1 and the second output switching element NNS1 of the first post negative output tap NT1, but are not limited thereto.

An output signal of the $n^{th}$ post negative output tap NTn may be output through a second terminal of the first output switching element NPSn and a first terminal of the second output switching element NNSn of the $n^{th}$ post negative output tap NTn. The output signal of the $n^{th}$ post negative output tap NTn may configure the second differential output signal $V_{outn}$.

An output signal of the main negative output tap NTM, an output signal of the pre negative output tap NT0, and output signals of the first to $n^{th}$ post negative output taps NT1 to NTn may be summated to configure the second differential output signal $V_{outn}$.

In this case, the first output switching element PPS0 included in the pre positive output tap PT0, the second output switching element PNS0 included in the pre positive output tap PT0, the first output switching element NPS0 included in the pre negative output tap NT0, and the second output switching element NNS0 included in the pre negative output tap NT0 may have the same coefficient. That is, the pre positive output tap PT0 and the pre negative output tap NT0 may have the same coefficient.

Also, the first output switching element PPSn included in the $n^{th}$ post positive output tap PTn, the second output switching element PNSn included in the $n^{th}$ post positive output tap PTn, the first output switching element NPSn included in the n'h post negative output tap NTn, and the second output switching element NNSn included in the $n^{th}$ post negative output tap NTn may have the same coefficient. That is, the $n^{th}$ post positive output tap PTn and the $n^{th}$ post negative output tap NTn may have the same coefficient.

The connection circuit 143 may adjust a connection between the first differential circuit 141 and the second differential circuit 142 based on one or more connection switching signals.

The connection circuit 143 may include one or more connection switching elements CS0 to CSn. The number of one or more connection switching elements CS0 to CSn may be less than the number of taps included in the equalizer 100, but is not limited thereto. The one or more connection switching elements CS0 to CSn may adjust a connection between the post positive output tap PT1 and the post negative output tap NT1, based on connection switching signals $EN_{pre}$ and $EN_{post1}$ to $EN_{postn}$.

The one or more connection switching elements CS0 to CSn may be switching elements having the second polarity (for example, a negative polarity, etc.), and in at least one example embodiment, the one or more connection switching elements CS0 to CSn may each be an NMOS, but are not limited thereto.

The one or more connection switching elements CS0 to CSn may respectively receive the connection switching signals $EN_{pre}$ and $EN_{post1}$ to $EN_{postn}$ through gate terminals their respective gate terminals. The one or more connection switching elements CS0 to CSn may be respectively connected to, through their respective first terminals (for example, drain terminals, etc.), nodes between the first output switching elements PPS0 to PPSn respectively included in the plurality of positive output taps PT0 to PTn and the second output switching elements PNS0 to PNSn respectively included in the plurality of positive output taps PT0 to PTn. The one or more connection switching elements CS0 to CSn may be respectively connected to, through their second terminals (for example, source terminals, etc.), nodes between the first output switching elements NPS0 to NPSn respectively included in the plurality of negative output taps NT0 to NTn and the second output switching elements NNS0 to NNSn respectively included in the plurality of negative output taps NT0 to NTn.

In at least one example embodiment, the one or more connection switching elements CS0 to CSn may respectively connect the plurality of positive output taps PT0 to PTn connected to the plurality of negative output taps NT0 to NTn connected when the plurality of positive output taps PT0 to PTn connected and the plurality of negative output taps NT0 to NTn connected are in an off state. Also, the connection switching element CS1 may have the same coefficient as that of each of a plurality of switching elements included in the plurality of positive output taps PT0 to PTn and the plurality of negative output taps NT0 to NTn. Therefore, even when the plurality of positive output taps PT0 to PTn and the plurality of negative output taps NT0 to NTn are in an off state, an output resistance based on the driver 140 may be maintained, and thus, impedance matching may be accurately performed and/or the impedance matching of the equalizer may be improved.

Figure 13:
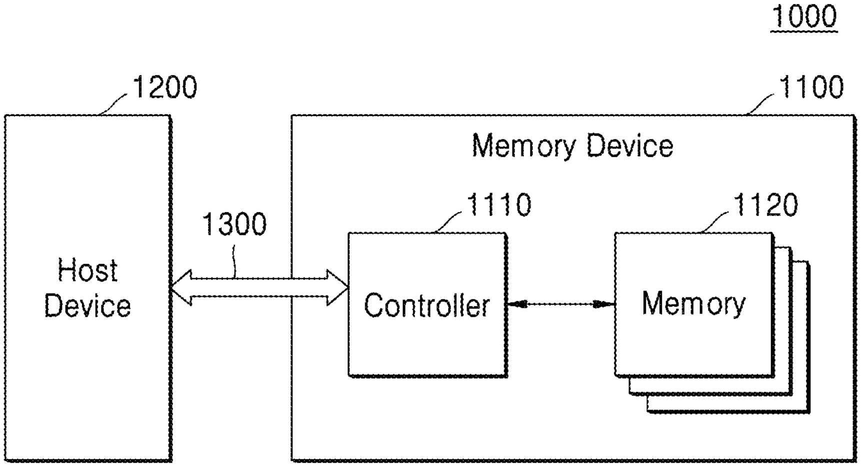
FIG. 13 is a diagram illustrating a system including an equalizer according to at least one example embodiment.

FIG. 13 is a diagram illustrating a system including an equalizer according to at least one example embodiment.

Referring to FIG. 13, a memory device 1100 and a host device 1200 may communicate with each other through at least one interface 1300, and the memory device 1100 may include a controller 1110 (e.g., processing circuitry, etc.) and/or a memory 1120, etc., but the example embodiments are not limited thereto.

The interface 1300 may use an electrical signal and/or an optical signal, and in at least one example embodiment, the interface 1300 may be implemented as, for example, serial advanced technology attachment (SATA) interface, SATA express (SATA-e) interface, serial attached small computer system (SAS) (serial attached SCSI) interface, etc., or any combinations thereof. The interface 1300 may include the equalizer 100 which is as illustrated in FIG. 2, but is not limited thereto. Therefore, as the output resistance of the interface 1300 is maintained, impedance matching may be accurately performed and/or may be improved, and thus, the reflection and/or distortion of a signal may be decreased and/or prevented.

In at least one example embodiment, the memory device 1100 may be coupled and/or removably coupled to the host device 1200 and may communicate with the host device 1200. The memory 1120 may be a non-volatile memory, and the memory device 1100 may be referred to as a storage system. For example, in at least one example embodiment, the memory device 1100 may be implemented as, e.g., a solid state drive (or solid state disk) (SSD), an embedded SSD (eSSD), a multimedia card (MMC), and/or an embedded MMC (eMMC), etc., but is not limited thereto. The controller 1110 may control the memory 1120 in response to a request received from the host device 1200 through the interface 1300, etc.

Figure 14:
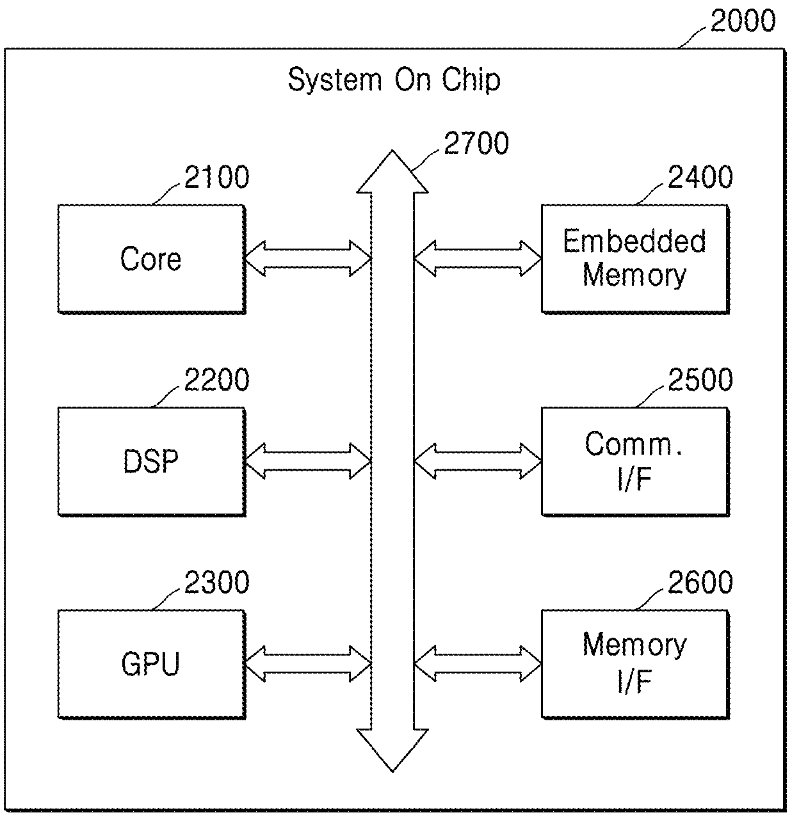
FIG. 14 is a diagram illustrating a system-on-chip including an equalizer according to at least one example embodiment.

FIG. 14 is a diagram illustrating a system-on-chip (SoC) 2000 including an equalizer according to at least one example embodiment.

Referring to FIG. 14, the SoC 2000 may denote a computing system and/or an integrated circuit into which parts of another electronic system are integrated. For example, an application processor (AP) which is a type of SoC 2000 may include at least one processor and other elements for performing other functions. As illustrated in FIG. 14, the SoC 2000 may include a core 2100 (e.g., processor core, etc.), a digital signal processor (DSP) 2200, a graphics processing unit (GPU) 2300, an internal memory 2400, a communication interface 2500, and/or a memory interface 2600, etc., but is not limited thereto, and for example, the SoC 2000 may include a greater or lesser number of components, etc. The elements of the SoC 2000 may communicate with each other through a bus 2700. According to some example embodiments, one or more of the SoC 2000, the core 2100, the DSP 2200, the GPU 2300, the internal memory 2400, the communication interface 2500, and/or the memory interface 2600, etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The core 2100 may process computer readable instructions and may control operation of the elements included in the SoC 2000, etc. For example, the core 2100 may process a series of computer readable instructions, and thus, may drive an operating system (OS) and/or may execute applications of the OS, etc. The DSP 2200 may process a digital signal (for example, a digital signal provided through the communication interface 2500) and may thus generate useful and/or desired data, etc. The GPU 2300 may generate data, which is for an image displayed by a display device, from image data provided from the internal memory 2400 and/or the memory interface 2600, and moreover, may encode the image data, etc. The internal memory 2400 may store data needed for operations of the core 2100, the DSP 2200, and/or the GPU 2300, etc. The memory interface 2600 may provide an interface for a memory (for example, dynamic random access memory (DRAM) or flash memory) outside the SoC 2000.

The communication interface 2500 may provide serial communication with the outside of the SoC 2000 (e.g., external devices, components, etc.). For example, the communication interface 2500 may access Ethernet, etc. The communication interface 2500 may include the equalizer 100 which is as illustrated in FIG. 2, but is not limited thereto. Therefore, as the output resistance of the communication interface 2500 is maintained, impedance matching may be accurately performed and/or may be improved, and thus, the reflection and/or distortion of a signal may be reduced and/or prevented, etc.

Hereinabove, various example embodiments have been described in the drawings and the specification. The example embodiments have been described by using the terms described herein, but this has been merely used for describing the inventive concepts and has not been used for limiting a meaning or limiting the scope of the example embodiments of the inventive concepts as defined in the following claims. Therefore, it may be understood by those of ordinary skill in the art that various modifications and other equivalent example embodiments may be implemented from the inventive concepts. Accordingly, the spirit and scope of the inventive concepts may be defined based on the spirit and scope of the following claims.

While various example embodiments of the inventive concepts have been particularly shown and described with reference to the drawings, it will be understood that various changes in form and details may be made therein without departing from the spirit and scope of the following claims.

What is claimed is:

1. An equalizer comprising:

a delay circuit configured to generate at least one delay signal based on at least one input signal;

an encoding circuit configured to generate a plurality of driving signals and a connection switching signal, based on the input signal and the delay signal;

a pre-driver configured to generate a plurality of driving switching signals based on the plurality of driving signals;

a first differential circuit configured to generate a first differential output signal based on the plurality of driving switching signals;

a second differential circuit configured to generate a second differential output signal based on the plurality of driving switching signals; and a connection circuit configured to adjust a connection between the first differential circuit and the second differential circuit based on the connection switching signal.

2. The equalizer of claim 1, wherein the delay circuit comprises:

at least one latch configured to delay the input signal to generate the delay signal.

3. The equalizer of claim 1, wherein the encoding circuit is configured to:

generate the plurality of driving signals based on the input signal and the delay signal.

4. The equalizer of claim 3, wherein the encoding circuit is configured to:

generate the connection switching signal based on the plurality of driving signals generated based on the delay signal.

5. The equalizer of claim 4, wherein the encoding circuit is configured to:

perform an XOR operation on the plurality of driving signals to generate the connection switching signal.

6. The equalizer of claim 1, wherein the pre-driver is configured to generate the plurality of driving switching signals by:

performing at least one inversion operation on a first set of the plurality of driving signals based on a ground voltage, and performing at least one inversion operation on a second set of the plurality of driving signals based on an operation voltage.

7. The equalizer of claim 1, wherein the first differential circuit comprises a main positive output tap and a post positive output tap each configured to generate the first differential output signal based on the plurality of driving switching signals;

the second differential circuit comprises a main negative output tap and a post negative output tap each configured to generate the second differential output signal based on the plurality of driving switching signals; and the connection circuit comprises a connection switching element, the connection switching element configured to adjust a connection between the post positive output tap and the post negative output tap based on the connection switching signal.

8. The equalizer of claim 7, wherein each of the main positive output tap and the post positive output tap comprises, a first output switching element including a first terminal and a second terminal, the first terminal configured to receive an operation voltage, the first output switching element having a first polarity, and a second output switching element including a third terminal and a fourth terminal, the third terminal connected to the second terminal of the first output switching element, the second output switching element having a second polarity;

each of the main negative output tap and the post negative output tap comprises, a third output switching element including a fifth terminal and a sixth terminal, the fifth terminal configured to receive the operation voltage, the third output switching element having the first polarity, and a fourth output switching element including a seventh terminal and an eighth terminal, the seventh terminal connected to the sixth terminal of the third output switching element, the fourth output switching element having the second polarity; and the connection switching element has the second polarity, the connection switching element including a ninth terminal and a tenth terminal, the ninth terminal connected to a node between the first output switching element included in the post positive output tap and the second output switching element included in the post positive output tap, and the tenth terminal connected to a node between the third output switching element included in the post negative output tap and the fourth output switching element included in the post negative output tap.

9. The equalizer of claim 7, wherein the connection switching element has a same coefficient as a coefficient of each of a plurality of switching elements included in each of the post positive output tap and the post negative output tap.

10. The equalizer of claim 7, wherein the connection switching element is further configured to:

connect the post positive output tap to the post negative output tap in response to the post positive output tap and the post negative output tap being in an off state.

11. An equalizer comprising:

a delay circuit configured to generate one or more delay signals based on at least one input signal;

an encoding circuit configured to generate a plurality of driving signals and one or more connection switching signals based on the input signal and the one or more delay signals;

a pre-driver configured to generate a plurality of driving switching signals based on the plurality of driving signals;

a first differential circuit configured to generate a first differential output signal based on the plurality of driving switching signals;

a second differential circuit configured to generate a second differential output signal based on the plurality of driving switching signals; and a connection circuit configured to adjust a connection between the first differential circuit and the second differential circuit based on the one or more connection switching signals.

12. The equalizer of claim 11, wherein the delay circuit comprises:

one or more latches configured to generate the one or more delay signals by delaying the input signal.

13. The equalizer of claim 11, wherein the encoding circuit is configured to:

generate the plurality of driving signals based on the input signal and the one or more delay signals.

14. The equalizer of claim 13, wherein the encoding circuit is configured to:

generate each of the one or more connection switching signals based on the plurality of driving signals and a same delay signal of the one or more delay signals.

15. The equalizer of claim 11, wherein the pre-driver is configured to generate the plurality of driving switching signals by:

performing at least one inversion operation on a first set of the plurality of driving signals based on a ground voltage, and performing at least one inversion operation on a second set of the plurality of driving signals based on an operation voltage.

16. The equalizer of claim 11, wherein the first differential circuit comprises a plurality of positive output taps configured to generate the first differential output signal based on the plurality of driving switching signals;

the second differential circuit comprises a plurality of negative output taps configured to generate the second differential output signal based on the plurality of driving switching signals; and the connection circuit comprises one or more connection switching elements configured to adjust connections between the plurality of positive output taps and the plurality of negative output taps based on the one or more connection switching signals.

17. The equalizer of claim 16, wherein each of the plurality of positive output taps comprises, a first output switching element including a first terminal and a second terminal, the first terminal configured to receive an operation voltage, the first output switching element having a first polarity, and a second output switching element including a third terminal and a fourth terminal, the third terminal connected to the second terminal of the first output switching element, the second output switching element having a second polarity;

each of the plurality of negative output taps comprises, a third output switching element including a fifth terminal and a sixth terminal, the fifth terminal configured to receive the operation voltage, the third output switching element having the first polarity, and a fourth output switching element including a seventh terminal and an eighth terminal, the seventh terminal connected to the sixth terminal of the third output switching element, the fourth output switching element having the second polarity; and each of the one or more connection switching elements has the second polarity, each of the one or more connection switching elements including a ninth terminal and a tenth terminal, each of the ninth terminals is connected to a node between the first output switching element and the second output switching element, and each of the tenth terminals is connected to a node between the third output switching element and the fourth output switching element.

18. The equalizer of claim 16, wherein each of the one or more connection switching elements has a same coefficient as a coefficient of each of a plurality of switching elements included in each of the positive output taps and the negative output taps.

19. The equalizer of claim 16, wherein each of the one or more connection switching elements is configured to connect a positive output tap of the plurality of positive output taps and a negative output tap of the plurality of negative output taps with each other in response to the positive output tap and the negative output tap being in an off state.

20. A transmitter for transmitting an input signal through a channel, the transmitter comprising:

a serializer configured to convert the input signal into a serial input signal; and an equalizer configured to generate a first differential output signal and a second differential output signal based on the serial input signal, the equalizer including, a delay circuit configured to generate one or more delay signals based on the serial input signal, an encoding circuit configured to generate a plurality of driving signals and one or more connection switching signals based on the serial input signal and the one or more delay signals, a pre-driver configured to generate a plurality of driving switching signals based on the plurality of driving signals, a first differential circuit configured to generate the first differential output signal based on the plurality of driving switching signals, a second differential circuit configured to generate the second differential output signal based on the plurality of driving switching signals, and a connection circuit configured to adjust a connection between the first differential circuit and the second differential circuit based on the one or more connection switching signals.

* * * * *